United States Patent
Ramaiyan et al.

(10) Patent No.: US 12,480,908 B1
(45) Date of Patent: Nov. 25, 2025

(54) SOLID STATE MULTI-ELECTRODE SENSOR ARRAY FOR REAL-TIME MONITORING OF MULTI-GAS MIXTURES

(71) Applicant: Triad National Security, LLC, Los Alamos, NM (US)

(72) Inventors: Kannan Ramaiyan, Los Alamos, NM (US); Cortney Kreller, Los Alamos, NM (US); Eric Lanich Brosha, Los Alamos, NM (US); Rangachary Mukundan, Los Alamos, NM (US)

(73) Assignee: TRIAD NATIONAL SECURITY, LLC, Los Alamos, NM (US)

( * ) Notice: Subject to any disclaimer, the term of this patent is extended or adjusted under 35 U.S.C. 154(b) by 86 days.

(21) Appl. No.: 18/521,507

(22) Filed: Nov. 28, 2023

Related U.S. Application Data

(62) Division of application No. 17/155,032, filed on Jan. 21, 2021, now abandoned.

(51) Int. Cl.
*G01N 27/30* (2006.01)
*G01N 27/416* (2006.01)

(52) U.S. Cl.
CPC ........ *G01N 27/301* (2013.01); *G01N 27/4162* (2013.01)

(58) Field of Classification Search
CPC .......................... G01N 27/301; G01N 27/4162
See application file for complete search history.

(56) References Cited

U.S. PATENT DOCUMENTS

| 6,605,202 B1 | 8/2003 | Mukundan et al. |
| 7,264,700 B1 | 9/2007 | Garzon et al. |
| 2003/0066519 A1* | 4/2003 | Wachsman ......... G01N 27/4074 123/703 |

(Continued)

OTHER PUBLICATIONS

Romanutsia et al., Application of advanced morphology Au—X(X= YSZ, ZrO2) composites as sensing electrode for solid state mixed-potential exhaust NOx sensor, Sensors and Actuators B: Chemical, 2015, 207, 391-397 (Year: 2015).*

(Continued)

*Primary Examiner* — Luan V Van
*Assistant Examiner* — Shizhi Qian
(74) *Attorney, Agent, or Firm* — Alston & Bird LLP

(57) ABSTRACT

A multi-electrode sensor array includes a substrate and n test couples on the substrate, wherein n is an integer of 2 or greater. Each test couple includes a pseudo-reference electrode and a sensing electrode including a material capable of oxidizing or reducing a gas of interest. A solid electrolyte layer that is common to and continuous over the n test couples may cover at least a portion of each pseudo-reference electrode and at least a portion of each sensing electrode. At least one of the n test couples may include an initial test couple and one or more duplicates thereof connected in electrical series, and a mixed potential may be measured across the electrical series. When multiple electrodes having different electrocatalytic activities are combined in the array of n test couples, mixed potential data from the array may be mathematically processed to accurately measure gas concentrations in a mixed-gas environment. The electrodes may be designed and arranged to increase the selectivity and sensitivity of the multi-electrode sensor array.

20 Claims, 9 Drawing Sheets

(56) References Cited

U.S. PATENT DOCUMENTS

| | | | | |
|---|---|---|---|---|
| 2008/0149499 A1* | 6/2008 | Ding | | G01N 27/4065 205/783.5 |
| 2009/0026076 A1* | 1/2009 | Yang | | G01N 33/0037 156/60 |
| 2010/0264900 A1* | 10/2010 | Blackburn | | G01N 27/4071 73/31.06 |
| 2013/0233728 A1* | 9/2013 | Day | | C04B 35/50 205/780.5 |
| 2016/0077044 A1* | 3/2016 | Arkenberg | | C22C 29/12 205/781 |
| 2018/0088078 A1* | 3/2018 | Dutta | | G01N 33/0037 |
| 2019/0033248 A1* | 1/2019 | Arkenberg | | G01N 27/4162 |

OTHER PUBLICATIONS

Mondal et al., Development of high sensitivity potentiometric NOx sensor and its application to breath analysis, Sensors and Actuators B: Chemical, 158 (2011) 292-298 (Year: 2011).*

Do et al., Amperometric sensor array for NOx, CO, O2 and SO2 detection, Sensors and Actuators B: Chemical, 122(1), 2007, 165-173 (Year: 2007).*

Liu et al., Solid-state gas sensors for high temperature applications—a review, Journal of Materials Chemistry A, 2014, 2, 9919 (Year: 2014).*

Javed et al., "Using sensor arrays to decode Nox/NH3/C3/H8 gas mixtures for automotive exhaust monitoring," Sensors and Actuators B: Chemical, 2018, 264, p. 110-118.

Ramaiyan et al., "Editors' Choice-Review-Recent Advances in Mixed Potential Sensors," Journal of the Electrochemical Society, 2020, 167(3), 037547.

Ramaiyan et al., "Response Characteristics of a Stable Mixed Potential Ammonia Sensor in Simulated Diesel Exhaust," Journal of the Electrochemical Society, 2017, 164(9), p. B448-B455.

U.S. Appl. No. 17/155,032, Final Office Action mailed Apr. 19, 2023.

U.S. Appl. No. 17/155,032, Non-Final Office Action mailed Dec. 14, 2022.

U.S. Appl. No. 17/155,032, Notice of Non-Compliant Amendment (37 CFR 1.121) mailed Sep. 1, 2023.

U.S. Appl. No. 17/155,032, Requirement for Restriction/Election mailed Aug. 8, 2022.

* cited by examiner

TS1: 20 + 20'
TS2: 30 + 30'

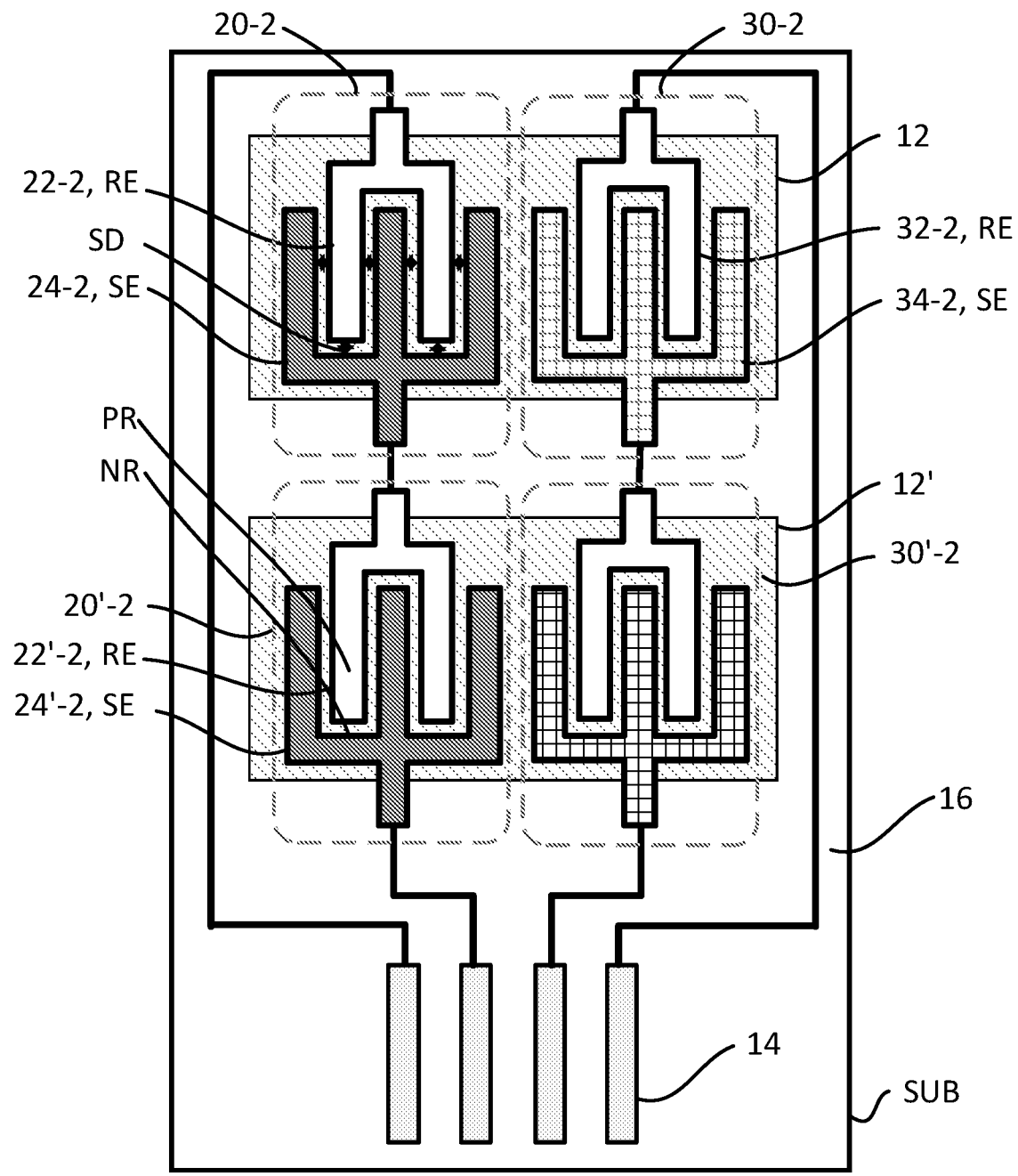

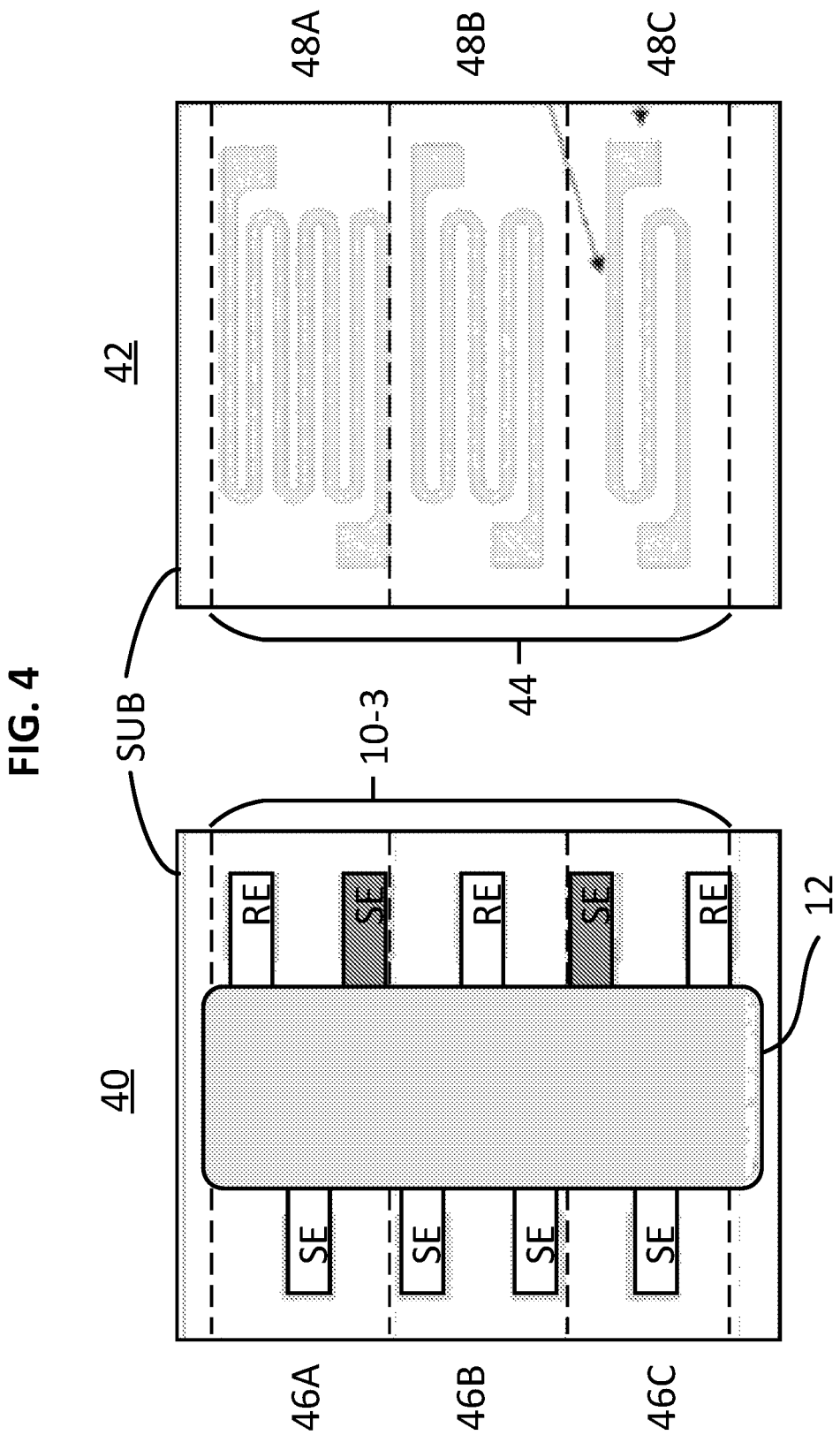

SOLID STATE MULTI-ELECTRODE SENSOR ARRAY FOR REAL-TIME MONITORING OF MULTI-GAS MIXTURES

CROSS REFERENCE TO RELATED APPLICATIONS

This application is a divisional of U.S. patent application Ser. No. 17/155,032, filed Jan. 21, 2021, the contents of which is incorporated by reference herein in its entirety.

STATEMENT REGARDING GOVERNMENT RIGHTS

The United States government has rights in this invention pursuant to Contract No. 89233218CNA000001 between the United States Department of Energy/National Nuclear Security Administration and Triad National Security, LLC for the operation of Los Alamos National Laboratory.

BACKGROUND

Commercial $NO_x$ and $NH_3$ gas sensor technologies are currently limited by cross-interference and/or a lack of selectivity, as well as limited detection ranges and durability. Further, at present there are no commercially available sensors specifically designed for non-methane hydrocarbons in environments or applications that include multiple gases, non-limiting examples of which include engine exhaust, poultry production facility exhaust, and other industrial exhaust.

Mixed potential sensors (MPS), also known as mixed potential electrochemical sensors (MPES), have been developed for certain gas sensing technologies. However, wider use of such sensors has been limited by a lack of suitable selectivity, sensitivity (e.g., inability to detect quantities down to 1 ppm), reproducibility, and durability (e.g., sensor drift).

SUMMARY

According to one or more embodiments of the present disclosure, a multi-electrode sensor array includes: a first test couple including a first sensing electrode and a first pseudo-reference electrode spaced apart from the first sensing electrode; a second test couple including a second sensing electrode and a second pseudo-reference electrode spaced apart from the second sensing electrode; and a common solid electrolyte layer that is continuous over the first test couple and the second test couple, covering at least a portion of the first sensing electrode, at least a portion of the first pseudo-reference electrode, at least a portion of the second pseudo-reference electrode, and at least a portion of the second sensing electrode. The first sensing electrode and the second sensing electrode may each include a material capable of oxidizing or reducing a gas of interest, and a ratio of the surface area of the first sensing electrode to the surface area of the first pseudo-reference electrode, and a ratio of the surface area of the second sensing electrode to the surface area of the second pseudo-reference electrode may each independently be greater than about 1:1 to about 2.5:1.

In some embodiments, the first pseudo-reference electrode and the second pseudo-reference electrode may each independently include at least one of platinum (Pt), lanthanum cobaltite, lanthanum ferrite, or lanthanum manganite.

In some embodiments, the first sensing electrode and the second sensing electrode may each independently include at least one of gold (Au), an Au—Pd alloy, lanthanum chromite, lanthanum strontium chromite, doped lanthanum chromite, a spinel, or a metal oxide.

In some embodiments, the common solid electrolyte layer may include at least one of yttria-stabilized zirconia (YSZ), Sc stabilized zirconia (ScSZ), Gd doped Ceria (GDC), or Sm doped Ce (SDC).

In some embodiments, a ratio of the surface area of the first sensing electrode to the surface area of the first pseudo-reference electrode and a ratio of the surface area of the second sensing electrode to the surface area of the second pseudo-reference electrode may each independently be about 2:1 to about 2.5:1.

In some embodiments, the first sensing electrode and the second sensing electrode may each include a concave region. The first pseudo-reference electrode may be positioned within and have a complementary shape with respect to the concave region of the first sensing electrode; and the second pseudo-reference electrode may be positioned within and have a complementary shape with respect to the concave region of the second sensing electrode.

In some embodiments, the first sensing electrode and the second sensing electrode may each have a shape with a plurality of U's. The first pseudo-reference electrode and the second pseudo-reference electrode may each have a complementary shape with respect to the first sensing electrode and the second sensing electrode, respectively; and the first and second pseudo-reference electrodes may be positioned within one or more concave regions of the first and second sensing electrodes, respectively, such that each pseudo-reference electrode is separated from each interior wall of each sensing electrode by a consistent separation distance.

In some embodiments, the multi-electrode sensor array may further include a common substrate under the first test couple and the second test couple; and a resistive heating wire on a side of the common substrate opposite the first and second test couples. The density of the resistive heating wire may be greater under the first test couple than under the second test couple.

In some embodiments, each of the first and second sensing electrodes may be operated at a different temperature between 300° C. to 600° C.

In some embodiments, the first and second test couples may share a single common pseudo-reference electrode, the first pseudo-reference electrode and the second pseudo-reference electrode both referring to the single common pseudo-reference electrode.

In some embodiments, the multi-electrode sensor array may further include a third test couple substantially similar to the first test couple, connected in series with the first test couple so that unlike electrodes are electrically connected, and a fourth test couple substantially similar to the second test couple, connected in series with the second test couple so that unlike electrodes are electrically connected. The first, second, third, and fourth test couples may be on a shared substrate.

According to one or more embodiments of the present disclosure, a multi-electrode sensor array includes a substrate and n test couples on the substrate (wherein n is an integer of 2 or greater); a solid electrolyte layer that is common to and continuous over the n test couples; and one or more duplicate test couples corresponding to one of the n test couples, each of the one or more duplicate test couples being electrically connected in a test series with its corresponding one of the n test couples. Each test couple includes a pseudo-reference electrode and a sensing electrode comprising a material capable of oxidizing or reducing a gas of interest. The solid electrolyte layer is discontinuous between the one or more duplicate test couples and corresponding one of the n test couples that are electrically connected in the test series. In each one of the n test couples and duplicate test couples, a ratio of the surface area of the sensing electrode to the surface area of the pseudo-reference electrode may be greater than about 1:1 to about 2.5:1.

In some embodiments, each pseudo-reference electrode may independently include platinum (Pt), lanthanum cobaltite, lanthanum ferrite, or lanthanum manganite.

In some embodiments, each sensing electrode may independently include gold (Au), an Au—Pd alloy, lanthanum chromite, a spinel, or a metal oxide.

In some embodiments, the solid electrolyte layer may include yttria-stabilized zirconia (YSZ).

In some embodiments, in each of the n test couples and duplicate test couples, a ratio of the surface area of the sensing electrode to the surface area of the pseudo-reference electrode is greater than about 2:1 to about 2.5:1.

In some embodiments, in each of the n test couples and duplicate test couples, the sensing electrode may be planar and may include a concave region; and the pseudo-reference electrode may be positioned within the concave region, and may have a complementary shape with respect to the concave region.

In some embodiments, in each of the n test couples and duplicate test couples, the sensing electrode may have a shape comprising one or more U's, the pseudo-reference electrode may have a complementary shape with respect to the sensing electrode, and the pseudo-reference electrode may be positioned within one or more concave regions of the sensing electrode, such that the pseudo-reference electrode is separated from each interior wall of the sensing electrode by a consistent separation distance.

In some embodiments, the multi-electrode sensor array may further include a resistive heating wire under at least a first and a second one of the n test couples and their corresponding duplicate test couples. The density of the resistive heating wire may be different under each of the at least first and second one of the n test couples and their corresponding duplicate test couples.

In some embodiments, at least one of the n test couples shares the same pseudo-reference electrode with another one of the n test couples.

BRIEF DESCRIPTION OF THE DRAWINGS

These and other features and advantages of embodiments of the present disclosure will be better understood by reference to the following detailed description when considered in conjunction with the accompanying drawings, in which:

FIG. 3 is a schematic drawing of a multi-electrode sensor array similar to that shown in FIG. 1, except that the sensing electrodes in each couple each have a E, W, or comb shape, or a shape formed of a plurality of U's, and are each paired with a pseudo-reference electrode having a complementary U shape interdigitated with or inserted into the E shape;

FIG. 4 is a schematic drawing showing the front and back sides of a substrate including a multi-electrode sensor array on the front side and an integrated heater on the back side;

DETAILED DESCRIPTION

Figure 1:
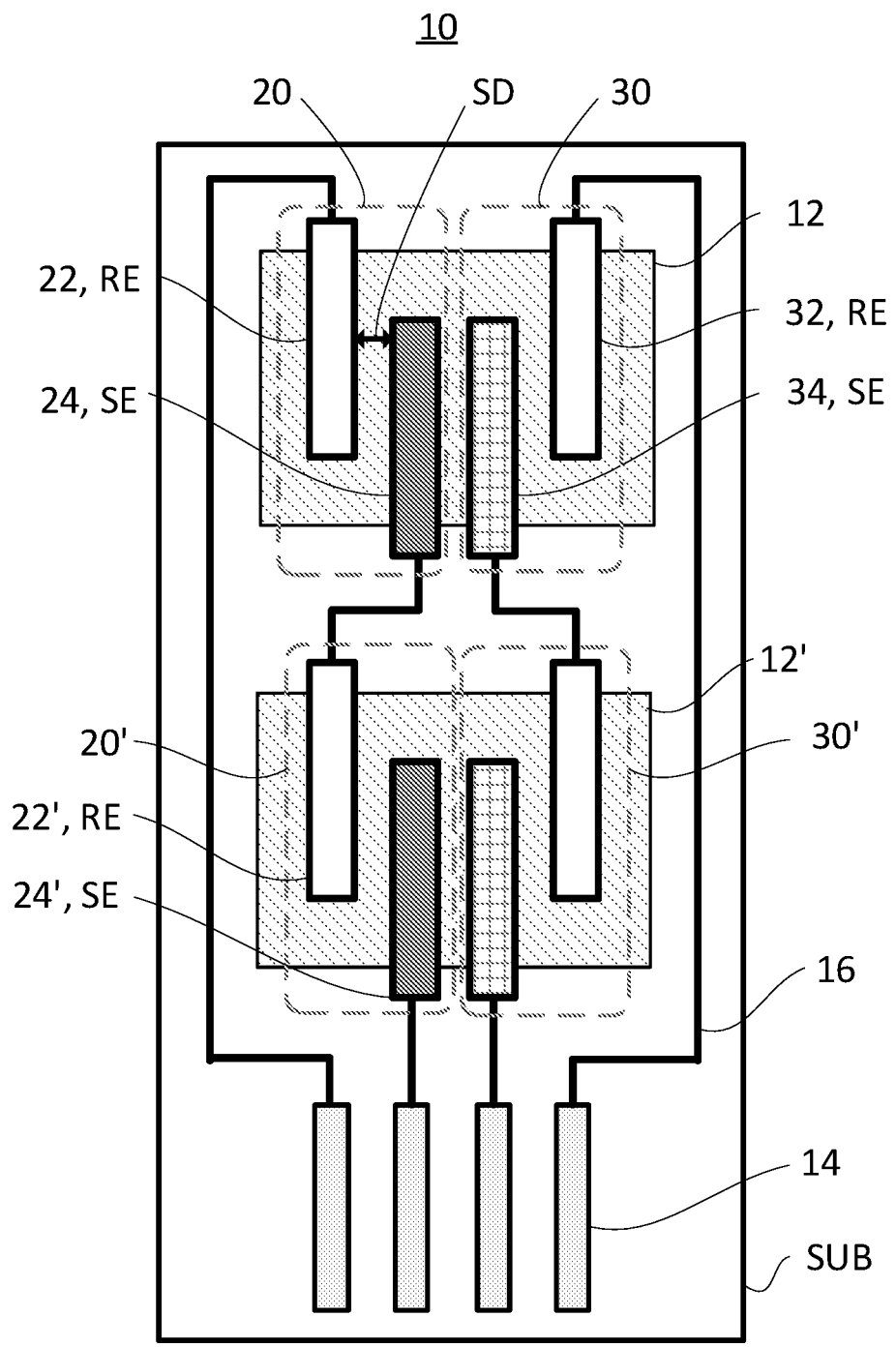
FIG. 1 is a schematic drawing of a multi-electrode sensor array including a total of four test couples connected in two series, the electrodes being rectangular and substantially parallel.

According to embodiments of the present disclosure, gas sensors having increased sensitivity and selectivity are useful for accurate detection and monitoring of gas emissions in various environments and applications. Such applications include (but are not limited to) engine and vehicle emissions, oil refining and factory emissions, air quality monitors, health monitors, and industrial and domestic animal agriculture operations. These applications and environments often contain a mixture of multiple gases of interest, which may fluctuate rapidly and be present in widely different concentrations. Accordingly, the robust and inexpensive gas sensors according to embodiments of the present disclosure are capable of accurately detecting and quantifying multiple analyte gases in real-time, without cross-interference (e.g., false positive signals from other gases that result in an overestimated concentration, and/or misidentification of detected gases).

Mixed potential sensors (MPS) or mixed potential electrochemical sensors (MPES) depend on the electrochemical oxidation or reduction of an analyte gas to generate a non-Nernstian potential (e.g., voltage or electromotive force, EMF). As a general example, a MPS may be envisioned as a solid-state electrochemical cell including a pseudo-reference electrode, a sensing (e.g., working) electrode capable of electrochemically reducing or oxidizing one or more analyte gases, and an oxygen-conducting solid electrolyte between and connecting the two electrodes. Under working conditions, the ambient environment contains oxygen ($O_2$) and the electrolyte contains $O^{2-}$ ions, which may be involved in oxidation or reduction, respectively, of one or more non-$O_2$ analyte gases.

The material in or on the sensing electrode may be electrocatalytically active for the reduction or oxidation of the one or more analyte gases. When the test system is exposed to the analyte gas(es), one or more redox reactions of the analyte gas, in addition to reduction of $O_2$, may occur at the sensing electrode. The net current of these cumulative reactions must be zero due to conservation of charge, resulting in polarization of the sensing electrode in order to achieve net zero current. The potential observed at the sensing electrode under these net zero current conditions is termed a mixed potential, and for example, may be a weighted voltage reflecting the kinetic competition between (or balancing of) various electrochemical redox reactions of the analyte gas and of $O_2$ at the surface of the sensing electrode. The mixed potential at the sensing electrode is then measured with respect to the mixed potential at the pseudo-reference electrode to yield a sensor reading (e.g., the potential difference between the two electrodes).

As can be understood from e.g., rate law theory and the Tafel equation, the competing kinetics of the various half-cell redox reactions occurring at the sensing electrode may depend, in part, on the concentrations of the reactive gases (reactants) at the surface of the electrode. Accordingly, the measured mixed potential can be correlated with the concentration(s) of the analyte gas(es). The correlation may be logarithmic or linear, as determined by the particular reaction kinetics at the working electrode (e.g., Butler-Volmer or mass transport limited). The specific mixed potential values and correlative relationship may additionally depend on the operating temperature and the compositions and structures of the electrodes and electrolyte, as these variables may affect the rates of diffusive and/or interfacial charge transfer steps in each reaction.

The pseudo-reference electrode and the sensing electrode may be independently selected from (e.g., include or be formed of) materials having disparate $O_2$ reduction kinetics (e.g., materials having a large difference in the rate of $O_2$ reduction when compared to each other). For example, the pseudo-reference electrode, which may be (or include) a Pt electrode, may have relatively fast $O_2$ reduction kinetics compared to the sensing electrode. Accordingly, $O_2$ may be reduced at the pseudo-reference electrode with high catalytic activity, but reduced at the sensing electrode with low catalytic activity. When the sensing electrode has low catalytic activity for $O_2$ reduction, the sensitivity of the MPS cell may be enhanced.

As used herein, the term "large difference" with respect to a redox reaction rate may be determined with respect to e.g., the maximum current density and/or the onset potential required to initiate reaction. For example, the maximum current density for a given reaction at the faster electrode (e.g., the pseudo-reference electrode) may be at least ten times, at least 100 times, or at least $10^3$ times (e.g., an order or several orders of magnitude) larger than the current density at the slower electrode. For example, the onset potential at the faster electrode may be at least 0.05 V, at least 0.25 V, or at least 0.5 V lower than that at the slower electrode. However, embodiments of the present disclosure are not limited thereto, and those having ordinary skill in the art are capable of selecting or ascertaining suitable scales of difference for a given electrode pair and reaction, desired sensitivity, application, etc.

When more than one gas that can be electrochemically oxidized or reduced at the sensing electrode is present, the resulting cross-sensitivity (e.g., simultaneous reaction to all such gases) may make it challenging to differentiate between the sources of (e.g., relative contributions to) the signal in order to separately measure the concentration of one specific gas, or alternatively to measure the partial pressures (e.g., concentrations) of each of the mixed gases. This is particularly challenging when only one sensor is available. To overcome this, multiple electrodes having slightly different sensing abilities may be combined in an array to simultaneously collect multiple data points, and the data from the array may be processed using mathematical algorithms (such as Bayesian modeling, neural networks, machine learning, etc.) to accurately decode the concentration of each gas.

A detailed description of a single sensor experimentally having a selective response to a single gas (ammonia) in the presence of other gases can be found in e.g., Ramaiyan, K. et al., "Response Characteristics of a Stable Mixed Potential Ammonia Sensor in Simulated Diesel Exhaust," *Journal of the Electrochemical Society,* 2017, 164(9), pg. B448-455, the entire content of which is incorporated herein by reference. In addition, a detailed description of the electrochemical theory behind the mixed potential voltage output of MPS and a model for fitting the electrode response to a mixed-gas mixture can be found in e.g., Javed, U. et al., "Using sensor arrays to decode $NO_x/NH_3/C_3H_8$ gas mixtures for automotive exhaust monitoring," *Sensors and Actuators B: Chemical,* 2018, 264, pg. 110-118, the entire content of which is incorporated herein by reference. A review of mixed potential sensor theory and materials for $NH_3$ sensing can be found in e.g., Ramaiyan, K. et al., "Editors' Choice—Review—Recent Advances in Mixed Potential Sensors," *Journal of the Electrochemical Society,* 2020, 167(3), 037547, the entire content of which is incorporated herein by reference.

Successful commercialization of MPS technology for gas sensing may require additional increases in sensing accuracy and sensitivity. For example, the accuracy of sensing near or below 1 ppm, for example to concentrations around 1 ppb, has been limited. Further, detection of species having low concentrations (e.g., below 100 ppm) may be difficult in the presence of other gases having higher concentrations and/or larger signals (e.g., due to large disparities in reaction kinetics). According to embodiments of the present disclosure, MPS sensors achieve enhanced sensitivity by tailoring of the electroactive interface and particular electrode array designs.

According to embodiments of the present disclosure, a multi-electrode sensor array includes a first test couple, a second test couple, and a common solid electrolyte layer that is continuous (or substantially continuous) over the first and second test couples. As used herein, the term "test couple" refers to any combination of a pseudo-reference electrode and a sensing electrode having a potential difference that can be usefully measured to determine the concentration of an analyte gas, according to the methods described herein. As used herein, the term "substantially continuous" indicates that the common solid electrolyte layer is in simultaneous contact with both or all of the indicated test couples, and for example, may be deposited as a unitary element over both or all of the indicated test couples, but also denotes that there can be some discontinuity in the common solid electrolyte layer so long as the discontinuity does not materially or significantly interfere with the function or properties of the common solid electrolyte layer, for example conduction of ions between the indicated test couples. The first test couple and the second test couple may be deposited together on the same (e.g., a single) common or shared substrate, and may be embedded together in the common solid electrolyte layer. The first test couple may include a first sensing electrode and a first pseudo-reference electrode spaced apart from the first sensing electrode. The second test couple may include a second sensing electrode and a second pseudo-reference electrode spaced apart from the second sensing electrode.

The first and second sensing electrodes may each independently comprise a material capable of oxidizing or reducing a gas of interest. The common solid electrolyte layer that is substantially continuous over the first and second test couples may cover at least a portion of the first sensing electrode, at least a portion of the first pseudo-reference electrode, at least a portion of the second pseudo-reference electrode, and at least a portion of the second sensing electrode. The first test couple and the second test couple may be (e.g., ionically) connected to each other through the common solid electrolyte layer.

Each pseudo-reference electrode may include or be formed of a material enabling a low mixed potential. In this context, the term "low" refers to a mixed potential value of less than 10 mV, or for example, less than 1 mV in the presence of the gases to be sensed. In some embodiments, a low mixed potential at the pseudo-reference electrode may be achieved by: (a) selecting an electrode material with relatively high electrocatalytic activity (e.g., fast kinetics, as defined above) for the $O_2$ reduction reaction (ORR), or (b) selecting a material with a heterogeneous catalysis rate for the analyte gas that is sufficiently high so that the concentration of excess reactants that can subsequently diffuse to the three-phase interface (discussed further below) to thereby contribute to the measured mixed potential is decreased or substantially limited. In some embodiments, the low mixed potential may be achieved by (c) selecting an electrode material with low or substantially no electrocatalytic activity for the analyte gas. As used herein, the term "having electrocatalytic activity" refers to the material being active as a catalyst for one or more redox (e.g., electron transferring) reactions of the gas, which would not happen in the absence of the material. The transfer of electrons results in generation of an electrical current. The term "low electrocatalytic activity" may refer to the electrode generating a current increase of less than one-fourth or less than one-tenth that generated at the sensing electrode when both are exposed to the analyte gas, and the term "substantially no electrocatalytic activity" may refer to an even lower current, for example at or around zero.

For example, the pseudo-reference electrode(s) may include or be formed of a heterogenous catalyst for the oxygen reduction reaction (ORR). In some embodiments, the pseudo-reference electrodes may each independently include a material selected from a noble metal or noble metal compound (such as platinum (Pt), ruthenium (Ru), palladium (Pd), and alloys thereof), lanthanum cobaltite (La-$CoO_3$), lanthanum ferrite (La$FeO_3$), and lanthanum manganite (La$MnO_3$). The material may be provided in any suitable format, and for example, may be provided as a powder, a metal or alloy sheet, nanocrystals, or nanosheets, or on a support structure such as carbon powder or graphite, etc.

Each sensing electrode may include or be formed of a material having electrocatalytic activity for an analyte gas of interest, while simultaneously having an electrocatalytic $O_2$ reduction rate lower than that of the pseudo-reference electrode, as shown by a relatively decreased current density and/or increased overpotential for the ORR (as discussed above). The catalyzed reactions may result in oxidation or reduction of the analyte gas, without limitation. In some embodiments, the sensing electrodes may each independently include a material selected from gold (Au), an Au—Pd alloy, a lanthanum chromite (La$CrO_3$)-based material (such as lanthanum chromite, lanthanum strontium chromite, or doped lanthanum chromite), an ionically and electrically conductive spinel (e.g., a compound having a spinel crystal structure), or a metal oxide (such as indium titanium oxide (ITO), $In_2O_3$, $CeVO_4$, or $WO_3$). However, embodiments of the present disclosure are not limited thereto, and any electrode material having suitable electrocatalytic activity may be selected according to the desired analyte gas or gas environment.

The analyte gas is not particularly limited, and may be any desired analyte gas. Non-limiting examples of common analyte gases include ammonia ($NH_3$), $NO_x$ gases such as nitric oxide (NO) and nitrogen dioxide ($NO_2$), hydrocarbons such as methane, ethane, ethene, propane, propene, etc., gaseous functionalized hydrocarbons bearing $NO_x$ and/or $NH_3$ groups (as relevant to e.g., detection of explosives and smog-derived complexes, discussed further below), carbon monoxide (CO), and hydrogen sulfide ($H_2S$). In some embodiments, for example, the analyte gas may include ammonia and the sensing electrode may include Au, an Au—Pd alloy, or $La_{0.8}Sr_{0.2}CrO_3$. The Au—Pd alloy may include, for example, 10% Pd and 90% Au. As another example, the analyte gas may include $NO_x$ and/or hydrocarbons, and the sensing electrode may include $La_{0.8}Sr_{0.2}CrO_3$ (LSC 80/20). In some embodiments, the Au—Pd alloy may have a higher melting point temperature than Au alone (e.g., pure Au, which has a melting point of about 1060° C.), and may thus be more compatible than a pure Au electrode with the fabrication and operating temperatures for the multi-electrode sensor array, as described below. For example, the melting point of the Au—Pd alloy may be about 1100° C. to about 1260° C.

The common solid electrolyte layer is not particularly limited, and may include (or be formed of) any suitable porous solid electrolyte available in the art that is stable under the fabrication and operation temperatures for the sensor array, as described herein. In some embodiments, the common solid electrolyte layer may include or be formed of an $O^{2-}$ conductive ceramic material. In some embodiments, for example, the common solid electrolyte layer may include or be formed of a doped zirconia, a doped ceria, lanthanum gallate doped with strontium (Sr) and magnesium (Mg) (i.e., LSGM), a lanthanum silicon aluminum oxide (LSAO), or combinations thereof. For example, the doped zirconia may be or include yttria-stabilized zirconia (YSZ), scandium-stabilized zirconia (ScSZ), or combinations thereof. For example, the doped ceria may be or include gadolinium (Gd)-doped ceria (GDC), samarium (Sm)-doped ceria (SDC), or combinations thereof. When the common solid electrolyte layer includes or is formed of YSZ, the concentration of yttrium (Y) in the YSZ may be about 3 mol % to about 8 mol %, for example, about 4 mol %, 5 mol %, 6 mol %, or 7 mol %.

The density of the common solid electrolyte layer may be selected to allow suitable diffusion of the analyte gas and/or $O_2$ from the ambient environment to the surface of the electrode beneath the common solid electrolyte layer, thereby facilitating formation of an electrode/analyte gas/electrolyte interface where redox reactions can occur. In some embodiments, the density of the common solid electrolyte layer may be about 60% to about 90%, about 60% to about 80%, or about 60% to about 70%. For example, the common solid electrolyte layer may have a porosity of about 10% to about 40%, about 20% to about 40%, or about 30% to about 40%.

In some embodiments, the sensing electrodes and pseudo-reference electrodes may each be substantially flat or planar. Here, the term "flat" indicates a layout or structure in which the thickness of each electrode is smaller than the width and length, and for example, may be less than $\frac{1}{4}^{th}$ the width, less than 1/8th the width, or less than 1/10th the width of the electrode. As used herein to describe electrodes deposited on the substrate, "thickness" refers to the average electrode dimension normal to the substrate, while "width" and "length" refer to the shortest and longest dimensions, respectively, of a regular polygonal envelope around the electrode within a plane parallel to the plane of the substrate. However, embodiments of the present disclosure are not limited thereto, and for example, the electrodes may each have a 3D or polyhedral shape, such as a prismatic or cylindrical (wire) shape.

In some embodiments, the sensing electrodes and pseudo-reference electrodes may each have a flat and substantially rectangular shape. The sensing electrode and the pseudo-reference electrode within each test couple may be positioned so that parallel or proximate sides or edges of the two electrodes within a given test couple are consistently separated by a first distance. In some embodiments, for example, as shown in FIG. 1, the sensing electrode (SE) and the pseudo-reference electrode (RE) may be generally rectangular in shape and may be positioned on a substrate (SUB) in the same plane so that the longest edges of adjacent sensing (SE) and pseudo-reference electrodes (RE) are substantially parallel to each other along a first direction. In such a configuration, a constant (or consistent) separation distance (SD) can be maintained between the longest parallel edges of the electrodes that face each other (as depicted by the vector between adjacent long edges of electrodes 22 and 24 in FIG. 1, denoted SD). In some embodiments, as also shown in FIG. 1, the sensing electrode (SE) and the pseudo-reference electrode (RE) may be offset from each other along the first direction (e.g., translated in opposite directions so the overlap of the electrode lengths is greater than 0% but less than 100%, for example, 50% to 90%) in order to facilitate attachment of electrical contacts to opposite ends of each electrode. For example, a portion of each sensing electrode (SE) and pseudo-reference electrode (RE) may subsequently not be covered by the common solid electrolyte layer (12) (described in more detail below), and electrical connections to the sensing electrodes (SE) and pseudo-reference electrodes (RE) may be made in those portions not covered by the common solid electrolyte layer (12).

Figure 2:
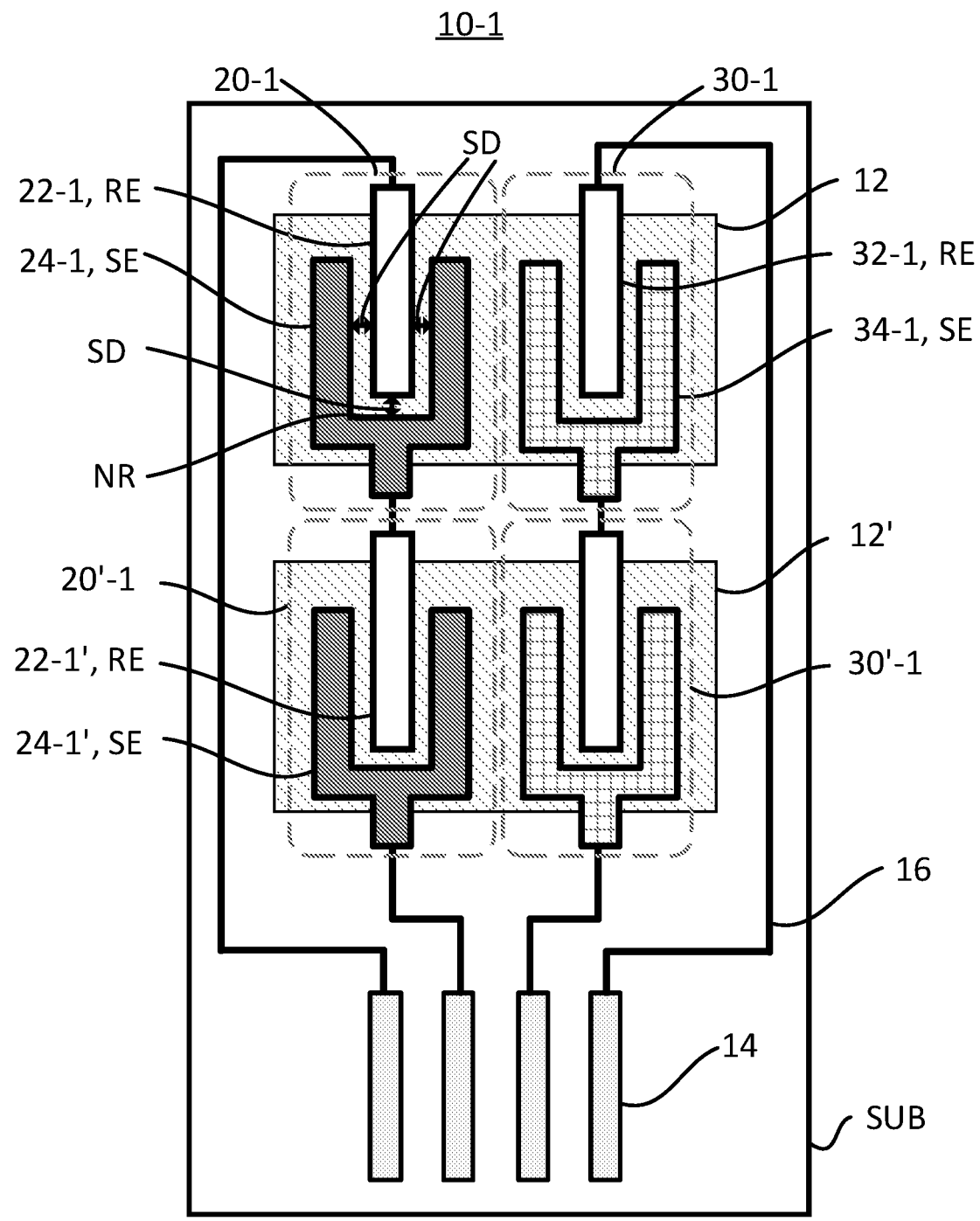
FIG. 2 is a schematic drawing of a multi-electrode sensor array similar to that shown in FIG. 1, except that the sensing electrodes in each couple have a U shape, and are paired with a pseudo-reference electrode having a complementary rectangular shape inserted into the U shape.

In some embodiments, for example as shown in FIG. 2, the sensing electrodes may each include at least one concave or cut-out region. For example, the shape of each sensing electrode may be envisioned as a smaller shape or region cut out of the side of a larger shape, where the negative region corresponding to the smaller shape is concave. Stated differently, the sensing electrodes may each have a generally non-linear shape, such as, for example, a generally curved, parabolic, bent, or other non-linear configuration. For example, in some embodiments, the generally non-linear shape (or the sensing electrode having a concave or cut-out region) may have a generally U-shaped or Y-shaped (or tuning fork shaped) configuration. In such embodiments, each pseudo-reference electrode (RE) may be positioned within the concave or negative region (NR) (e.g., within the U-shape as shown in FIG. 2), and may have a complementary shape with respect to its coupled (nearby) sensing electrode (SE). For example, the first pseudo-reference electrode (22-1) may have a complementary shape with respect to the concave region of the first sensing electrode (24-1); and the second pseudo-reference electrode (32-1) may have a complementary shape with respect to the concave region of the second sensing electrode (34-1). Here, the term "complementary shape" refers to the pseudo-reference electrode having a region of the same general shape or perimeter (e.g., similar arrangement of angles and sides) as the concave or cutout region of its paired sensing electrode, but that is offset in position, and/or proportionally smaller in size and/or side lengths in one or both dimensions so that the pseudo-reference electrode (RE) can be placed within the concave region (NR) without contacting (e.g., being in electrical contact with) the sensing electrode (SE). For example, "complementary shape" may indicate that the pseudo-reference electrode (RE) fits generally within the concave region (NR) of its paired sensing electrode (SE), such that the pseudo-reference electrode (RE) nests within the concave region (NR) while maintaining a consistent (or constant) separation distance (SD) from the sensing electrode (SE) along at least the longest sides of the pseudo-reference electrode (RE) (as generally shown in FIG. 2).

In some embodiments, the pseudo-reference electrode (RE) may be positioned within the concave region (NR) of the sensing electrode (SE) such that the pseudo-reference electrode (RE) is separated from each interior wall of the U-shaped electrode by a consistent separation distance (SD). For example, each of the three pairs of facing sides of the sensing electrode (SE) and the pseudo-reference electrode (RE) (including the long sides and the short inner side) may each independently be parallel to each other and separated by the same (consistent) separation distance (SD) (as generally shown in FIG. 2).

Figure 2A:
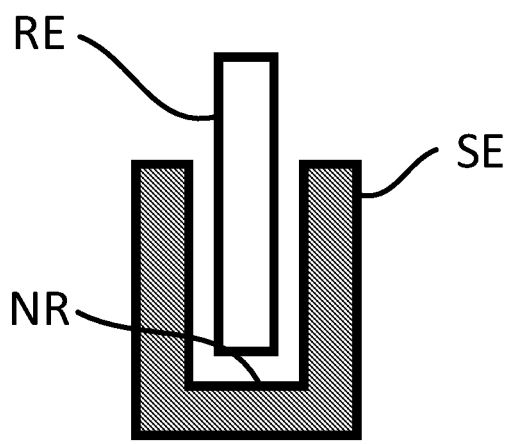
FIGS. 2A-2B are schematic drawings of U-shaped sensing electrodes having a center concave shape (negative region), paired with rectangular pseudo-reference electrodes inserted in the negative region; the sensing electrode of FIG. 2B further includes a connecting portion connected to a middle region of the U-shape on the opposite side of the negative region and extending away from the negative region.
Figure 2B:
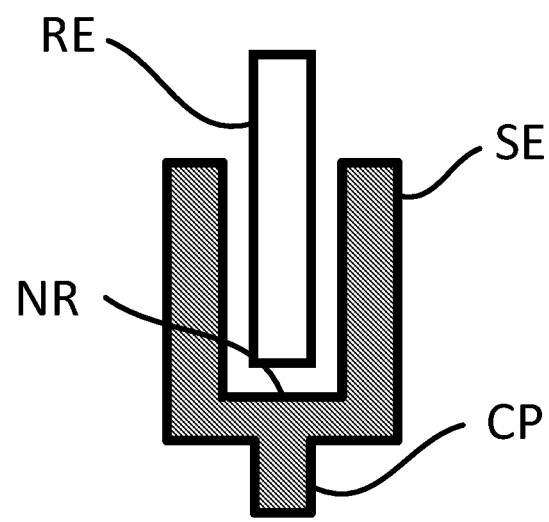

In some embodiments, as referenced generally above, each sensing electrode (SE) may be a U-shaped (or Y-shaped, or tuning fork shaped) electrode, and each pseudo-reference electrode (RE) may be a rectangular electrode arranged within the opening of a respective U-shaped (or Y-shaped, or tuning fork shaped) electrode. While U-shaped (or Y-shaped, or tuning fork shaped) sensing electrodes and rectangular shaped pseudo-reference electrodes are described here (and above) and depicted in FIG. 2, it is understood that the concave region (NR) of the sensing electrodes described above is not limited to this configuration. Instead, as noted above, the concave region is not particularly limited, and may be any concave shaped region. In some embodiments, for example as shown in FIG. 2A, the "U" shaped (or Y-shaped, or tuning fork shaped) electrode may be an angular U including three rectangular regions connected at two right angles. In some embodiments, for example as shown in FIGS. 2 and 2B, the sensing electrode (SE) may also include a connecting portion (CP) connected to the middle region of the U-shape and extending away from the concave region (NR) so that the sensing electrode (SE) including the connection portion (CP) resembles a tuning fork (or Y-shape). In some embodiments, the two side rectangular regions of the U-shape may be longer than the middle rectangular region, e.g., the U may be taller than it is wide, as shown, for example, in FIGS. 2, 2A, and 2B. However, the present disclosure is not limited to such a configuration. Indeed, in some embodiments, the middle rectangular region may be the same size as, or longer than the two side rectangular regions, e.g., making the U have the same length (or height) as width, or have a greater width than length (or height).

Embodiments of the present disclosure are also not limited to the shapes and configurations described above, and other electrode shapes and arrangements are possible. In some embodiments, for example, the sensing (SE) and/or the pseudo-reference electrode (RE) may be an E-shaped or W-shaped electrode to accommodate multiple and/or alternative electrode pairings, as discussed below. For example, a first electrode may be shaped like a comb with a plurality of teeth, and one or more additional electrodes may be wholly positioned, or may have extensions that are positioned between those "teeth". In some embodiments, for example, the sensing electrode and the pseudo-reference electrode may have interlocking and/or interdigitated shapes and arrangements with respect to each other, for example, a plurality of interdigitated U's. FIG. 3 is an example electrode configuration in which a first test couple (20-2) includes a first Cr sensing electrode (24-2) shaped like a W, E, or comb, which is interdigitated with a first Pt pseudo-reference electrode (22-2) shaped like a U or Y. While FIG. 3 shows the comb shape of the sensing electrode with three prongs defining 2 U-shaped regions, it is understood that the present disclosure is not limited to this configuration. Instead, the comb shape can have any suitable number of prongs defining any suitable number (plurality) of U-shaped regions, including 4 or more prongs defining 3 or more U-shaped regions. In such configurations, the larger comb shaped sensing electrode would be interdigitated with a corresponding number of pseudo-reference electrodes (i.e., corresponding to the number of U-shaped regions in the sensing electrode and depending on the shape or configuration of the pseudo-reference electrode).

Furthermore, although the electrodes (the sensing electrodes and pseudo-reference electrodes) and substrates are shown in FIGS. 1-3 (described below) as being substantially rectangular (prismatic) in shape or composed of connected substantially rectangular shapes, the present disclosure is not limited thereto, and any suitable shape and configuration of the electrodes may be used. For example, other embodiments may include electrodes and substrates having other shapes and form factors, e.g., triangular, conical, cylindrical, etc.

The separation distance between paired electrodes may be selected to decrease or minimize resistance (e.g., signal noise) when measuring the potential between electrodes. In general, larger separation distances between paired electrodes may result in larger amounts of signal noise due to increased electrical resistance. As such, shorter separation distances may allow for improved signal sensitivity. For example, the separation distance may be about 1 mm to about 10 mm, about 2 mm to about 7 mm, or about 3 mm to about 5 mm. However, embodiments of the present disclosure are not limited thereto, and the separation distance may be any suitable distance as long as the electrodes are not in electrical contact and the signal to noise ratio is acceptable for the sensitivity of the application.

The amount of current that can be generated at the electrode/analyte gas/electrolyte interface may increase with increasing interfacial surface area (e.g., between paired electrodes). When the amount of current is large, fluctuations in current may be correspondingly larger and easier to detect. Accordingly, the surface area of the sensing electrode may be increased, relative to that of the pseudo-reference electrode, to allow for increased sensor sensitivity. In some embodiments, a ratio of the surface area of the sensing electrode to the pseudo-reference electrode in each test couple may be greater than about 1:1 to about 2.5:1, for example, about 1.2:1 to about 2.4:1, about 1.5:1 to about 2.2:1, or about 1.75:1 to about 2:1. In some embodiments, the ratio may be about 2:1 to about 2.5:1. In some embodiments, the ratio larger than 1:1 may be facilitated by selecting one of the electrode layouts described above. In some embodiments, for example, a surface area ratio within the above ranges may be easier to achieve when the sensing electrode is a U-shaped electrode having multiple connected rectangular regions, as shown in FIG. 2. However, a surface area ratio within the above ranges may also be achieved using the configuration illustrated in FIG. 1, in which the pseudo-reference electrode and sensing electrode each have a single rectangular region.

The common solid electrolyte layer (12) may be deposited over a sensing electrode paired with a pseudo-reference electrode in order to mediate ion (e.g., $O^{2-}$) transfer between the pair of electrodes without enabling transfer of electrical current (e.g., shorting). Accordingly, a measurable potential difference may be generated between the two electrodes (i.e., the sensing electrode and the pseudo-reference electrode). The thickness and shape (layout) of the common solid electrolyte layer is not particularly limited as long as the layer covers a sufficient surface area of each electrode so that the resulting three-phase interface area between the electrode/analyte gas/electrolyte can provide sufficient sensor sensitivity as described above. For example, the common solid electrolyte layer may have a thickness of about 1 mm to about 5 mm, or about 2 mm to about 4 mm. In some embodiments, the common solid electrolyte layer may cover a portion of each electrode, leaving a remaining portion uncovered to facilitate electrical connection (e.g., of lead wires) to that remaining portion. For example, the common solid electrolyte layer may cover at least 50% of the surface area of each electrode, for example, at least 70%, 75%, 80%, 90%, or 95%.

In the multi-electrode sensor array, the common solid electrolyte layer may be collectively (commonly) deposited over two or more test couples so that they are ionically connected. For example, the first test couple (20) and the second test couple (30) may be ionically connected to each other through the common solid electrolyte layer (12), as shown, for example, in FIGS. 1-3. When the test couples are connected in this manner, a mixed potential can be measured across any suitable pair of electrodes (e.g., the first sensing electrode and the first pseudo-reference electrode, and/or the first sensing electrode and the second pseudo-reference electrode), as may be desired to generate additional data points for a particular analyte gas.

In some embodiments, the multi-electrode sensor array may include connection pads (14) electrically connected to the electrodes via connections or wires (wire traces)(16) in order to facilitate measurement of the potential differences between two electrodes. The electrical connections and connection pads may be formed of any suitable electrically conductive materials, using any suitable techniques available in the art. As described above, and as shown in FIGS. 1-3, the connections may contact each electrode in a region that is not covered by the common solid electrolyte layer (12). In some embodiments, the connection pads (14) may be arranged at one edge of the substrate, similar to the arrangement of connection pads in a chip or port, to facilitate automated output (reading) of the data.

In some embodiments, the first and/or second test couples of the multi-electrode sensor array may be part of one or more test series. For example, in some embodiments, the multi-electrode sensor array (10) may further include a third (duplicate) test couple (20') that is a duplicate of (e.g., substantially similar to) the first test couple (20), and is connected in series with the first test couple (20) so that unlike electrodes are electrically connected, thereby forming a first test series (TS1). In the first series, the sensing electrode (24) of the first test couple (20) may be electrically connected to the pseudo-reference electrode (22') of the third (duplicate) test couple (20'). In some embodiments, the multi-electrode sensor array (10) may further include a fourth (duplicate) test couple (30') that is a duplicate of (e.g., substantially similar to) the second test couple (30), and which is connected in series with the second test couple (30) so that unlike electrodes are electrically connected, thereby forming a second test series (TS2). FIGS. 1 to 3 show examples of electrode arrangements including first and second test couples (20 and 30, respectively) and third and fourth duplicate test couples (20' and 30', respectively) connected in this manner. For example, the multi-electrode sensor array may include two or more initial test couples (e.g., the first and second test couples), and one or more duplicate test couples (e.g., the third and/or fourth duplicate test couples) corresponding to one or more of the initial test couples (i.e., the corresponding first and/or second test couple(s)), and like (identical) test couples (i.e., the initial test couple and its corresponding duplicate test couple(s)) may be connected to each other in electrical series. For example, one or more third duplicate test couples of the first (initial) test couple may be connected in electrical series with the first (initial) test couple to form a first test series. Additionally or alternatively, one or more fourth duplicate test couples of the second (initial) test couple may be connected in electrical series with the second (initial) test couple for a second test series. It is understood that while examples including one or two test series are described here, more than two test series may also be used. When a potential difference is measured across a test series (e.g., across the first test series or the second test series), the potentials are additive, and the measured cumulative signal and signal to noise ratio may be higher. As such, the sensitivity of the measurement across the particular test series (i.e., the particular sensing/pseudo-electrode pair) may be increased or improved. The number of duplicate test couples (e.g., third or fourth duplicate test couples) connected in series to a given initial test couple (e.g., the first or second test couple, respectively) within a given test series (e.g., within the first or second test series) is not particularly limited, and for example, may be 1 (e.g., no duplicate test couples), 2, 3, 4, 5, 6, etc. The number of duplicate test couples (e.g., third or fourth duplicate test couples) connected in series to a given initial test couple (e.g., the first or second test couple, respectively) within a given test series (e.g., the first or second test series) may be independently selected, for example, as needed to enhance the sensitivity of some measurements more than others.

As shown in FIGS. 1-3, each test couple within a test series should be ionically insulated from the other test couples within that same test series. For example, the duplicate test couples should each be under separate solid electrolyte layers, and should not share a common solid electrolyte layer with each other or with the corresponding initial test couple. Stated another way, for example, the solid electrolyte layer should be substantially discontinuous between the initial test couple and its duplicates connected in series (e.g., between each element of the test series).

FIGS. 1-3 are schematic diagrams of various examples of multi-electrode sensor arrays according to embodiments of the present disclosure. For example, FIG. 1 depicts a multi-electrode sensor array 10 including a first test couple 20 and a second test couple 30 on a substrate (SUB). The first and second test couples 20 and 30 are spaced apart from each other and are both partially covered with a continuous common solid electrolyte layer 12. The first test couple 20 includes a first pseudo-reference electrode 22 and a first sensing electrode 24 spaced apart from the first pseudo-reference electrode 22. Likewise, the second test couple 30 includes a second pseudo-reference electrode 32 and a second sensing electrode 34 spaced apart from the second pseudo-reference electrode 32. In the multi-electrode sensor array 10 of FIG. 1, each of the electrodes 22, 24, 32, and 34 (and duplicates thereof) is shown as having a flat and substantially rectangular shape, and the electrodes are arranged so that their long edges are parallel, but the present disclosure is not limited thereto, as discussed above.

In some embodiments, the first and second pseudo-reference electrodes 22 and 32 are both formed of the same material (e.g., Pt), but the first and second sensing electrodes 24 and 34 are formed of different materials. For example, the first sensing electrode 24 may be formed of lanthanum chromite and the second sensing electrode 34 may be formed of Au. Accordingly, the first test couple 20 and the second test couple 30 may include different sensing electrodes, and may thus generate different potential differences in response to the same gas environment. However, the present disclosure is not limited thereto, as discussed above.

FIG. 1 depicts an array including two duplicate test couples 20' and 30' of the first and second test couples 20 and 30, where the electrodes in each duplicate test couple are understood to be the same, as described above. The first test couple 20 and its duplicate 20' are connected in electrical series to each other and to two connection pads 14 via wires 16, thereby forming a first test series (TS1) having a first cumulative potential that can be addressed via the connection pads. Likewise, the second test couple 30 and its duplicate 30' are connected in electrical series to each other and to two connection pads 14 via wires 16, thereby forming a second test series (TS2) having a second cumulative potential that can be addressed via the connection pads 14. As stated above, the number of different test couples and the number of duplicates within each test series are not limited to the numbers shown in the drawings, and a multi-electrode sensor array may include any suitable number of test couples. Furthermore, although the electrodes in FIG. 1 are depicted as having substantially similar planar surface area, embodiments of the present disclosure are not limited thereto, and for example, each sensing electrode may be larger than each pseudo-reference electrode as described herein.

In the following descriptions of FIGS. 2 and 3, identical or similar elements will be labeled with identical or similar reference numbers, and will be understood to have identical or similar descriptions unless specifically described otherwise herein. FIG. 2 depicts a multi-electrode sensor array 10-1 including a first test couple 20-1 and a second test couple 30-1. FIG. 2 differs from FIG. 1 in that the first and second sensing electrodes 24-1 and 34-1 each have a U-shaped, Y-shaped, or tuning fork shaped configuration. The rectangularly shaped first and second pseudo-reference electrodes 22-1 and 32-1 are positioned within the concave regions (NR) of their respectively paired sensing electrodes to maintain a consistent separation distance (SD) therebetween. Each sensing electrode 24-1 and 34-1 has a larger surface area than its paired pseudo-reference electrode 22-1 or 32-1, and is placed around the outer perimeter of each sensing electrode. The array of FIG. 2 thus has an increased ratio of the sensing electrode surface area to the pseudo-reference electrode surface area, and may thus provide increased sensitivity, compared to the array of FIG. 1.

FIG. 3 depicts a multi-electrode sensor array 10-2 including a first test couple 20-2 and a second test couple 30-2. FIG. 3 differs from FIG. 1 in that the first and second sensing electrodes 24-2 and 34-2 each have a W-shaped, E-shaped, or comb shaped configuration, and the first and second pseudo-reference electrodes 22-2 and 32-2 each have a U-shaped, Y-shaped, or tuning fork shaped configuration.

Each pseudo-reference electrode 22-2 and 32-2 has a smaller area than each sensing electrode 24-2 and 34-2. The first and second sensing electrodes 24-2 and 34-2 are paired with the first and second pseudo-reference electrodes 22-2 and 32-2 so that the convex regions or protrusions (PR) of each pseudo-reference electrode are positioned within the concave regions (NR) of their respectively paired sensing electrodes 24-2 and 34-2 to maintain a consistent separation distance therebetween. Each sensing electrode 24-2 and 34-2 has a larger surface area than its paired pseudo-reference electrode 22-2 and 32-2, and a protrusion (PR) of each pseudo-reference electrode 22-2 and 32-3 may be placed in the middle or "inside" of one of the U-shaped concave regions (NR) of each sensing electrode. The array of FIG. 3 has an increased ratio of the sensing electrode surface area to the pseudo-reference electrode surface area, and may thus provide increased sensitivity, compared to FIG. 1.

During operation, the multi-electrode sensor array may be operated at temperatures well above room temperature (e.g., 300° C. to 600° C.), as may be needed for the sensing electrode to generate a mixed potential. For example, electrocatalytic redox reactions of the analyte gases at the sensing electrodes may occur only within the above-described operating temperatures. In some embodiments, the multi-electrode sensor array may be held in a temperature controlled environment or exposed to an external or ambient heat source. In some embodiments, the multi-electrode sensor array may include an integrated heater (e.g., a heater integrated into the sensor array). In some embodiments, for example, the multi-electrode sensor array may include a resistive heating wire on the opposite side of the substrate, such that when current is passed through the resistive heating wire, the test couples or the sensing electrodes on the opposite side of the substrate are conductively heated. The path of the resistive heating wire on the substrate may be concentrated in regions coinciding with the electrodes beneath the common solid electrolyte layer.

FIG. 4 is a schematic drawing of a multi-electrode sensor array 10-3 designed so that various test couples within the array can be operated at different temperatures. The multi-electrode sensor array 10-3 is patterned on the front side 40 of a substrate (SUB), and an integrated heater 44 is patterned on the backside 42 of that substrate (SUB). The multi-electrode sensor array 10-3 includes a series of sensing electrodes SE and pseudo-reference electrodes RE that are ionically connected under a common solid electrolyte layer 12 and arranged in three zones 46A, 46B, and 46C. The integrated heater 44 on the back side 42 of the substrate SUB is a resistive heating wire having three different densities 48A, 48B, and 48C corresponding to the three zones 46A, 46B, and 46C. It will be understood that the integrated heater shown in FIG. 4 can be adapted to other multi-electrode sensor array layouts.

The substrate may be an electrically insulating substrate. The materials and the thickness of the substrate may be selected so that the multi-electrode sensor array is mechanically stable, but is not particularly insulating against heat, and is not melted at the operating temperature of the array. For example, the substrate may be formed of a high-temperature resin or an inorganic material such as alumina, magnesium oxide (MgO), ceria, or zirconia.

In some embodiments, the density of the resistive heating wire on the opposite side of the substrate in regions coinciding with the electrodes may vary between different electrodes or test couples (and their corresponding duplicate test couples). In some embodiments, for example, the density of the resistive heating wire may be greater under the first test couple than under the second test couple, or vice versa. Further, when the multi-electrode sensor array includes one or more test series (each of which includes one or more duplicate test couples connected in series to an initial test couple), the density of the resistive heating wire may be the same (constant) under all test couples within a single test series (i.e., under each of the initial test couple and each of its corresponding one or more duplicate test couples), so that each test couple in the same electrical test series is held at the same temperature condition. However, the density of the resistive heating wire may differ under different test series. For example, in some embodiments, the density of the resistive heating wire may be greater under the first test series than under the second test series, or vice versa. In some embodiments, separate heating wires may be used under the different test couples (or different test series) to allow for independent and flexible control over the temperature of each test couple (or each test series) or zone. Accordingly, the degree of heating may vary between different test couples (or different test series). As the mixed potential depends on the operating temperature, and the kinetics of various gas redox reactions may respond differently to changes in operating temperature (e.g., at different rates $d^2i/dT^2$, where i is the current and T is temperature), test couples having the same sensing electrode composition held at different operating temperatures may have differing mixed potentials in response to the same mixture of analyte gases. The differing mixed potentials can then be deconvoluted as discussed above, taking into account their differing operating temperatures, to provide more sensitive and accurate measurements.

When the operating temperature is too low, the signal to noise ratio of the sensor may be unsuitably low, due to increased internal resistance. When the operating temperature is too high, on the other hand, the kinetics of all gas oxidation and reduction reactions may be universally improved (as predicted by rate law theory) so that the mixed potential of the sensing electrode approaches the mixed potential of the pseudo-reference electrode, resulting in a potential difference of zero. In some embodiments, for example when the sensing electrodes are each formed of different materials, the entire multi-electrode sensor array may be operated at a single temperature between 300° C. to 600° C., for example, 400° C. to 600° C.

In some embodiments, two or more sensing electrodes may be operated at a different temperature between 300° C. to 600° C. For example, when the multi-electrode sensor array has two sensing electrodes having the same composition that are not connected in electrical series for enhanced sensitivity (as described above), the two sensing electrodes having the same composition may be operated at different temperatures in order to provide two different mixed potential data points. For example, the operating temperature of each test couple may be at least 300° C., and may vary by about 10° C., about 20° C., or about 50° C. However, embodiments of the present disclosure are not limited thereto, and those having ordinary skill in the art may choose suitable operating temperatures for each electrode in the array according to the sensitivity requirements of the application, as guided by device calibration.

The number (n) of unique test couples (e.g., test couples including a sensing electrode with a particular composition and operating temperature) in the multi-electrode sensor array is not particularly limited as long as it is 2 or more. In some embodiments, the number (n) of test couples may be 2 to 8, for example, 3 to 5. The Bayesian modeling used to interpret the results may provide increased sensitivity and accuracy when the number of test couples is 3 to 5, with diminishing returns for each additional test couple beyond that number. Here, when two test couples have the same sensing electrode concentration, are operated at the same temperature, and are electrically connected in series, only one in the series is counted as a "unique test couple" (the other being duplicative).

According to embodiments of the present disclosure, a potential difference may be measured (e.g., via the connection pads) between any suitable pair of electrodes. For example, the electrodes in the multi-electrode sensor array can be combined (measured) in a combinatorial fashion to provide additional data points while minimizing or reducing the number of electrodes. In contrast, in the related art, two electrodes may be needed for each data point. In some embodiments, for example, the multi-electrode sensor array may include 3 electrodes (1 pseudo-reference and 2 sensing electrodes) to provide two data points, instead of needing 4 electrodes for the same two data points. For example, the multi-electrode sensor array may include 4 electrodes (1 pseudo-reference and 3 sensing electrodes) to provide 3 data points), instead of needing 6 electrodes for the same 3 data points. The simultaneous (concurrent) collection of multiple data points from different couples may allow for detection and quantification of multiple gases within a mixture, as described above.

Figure 5:
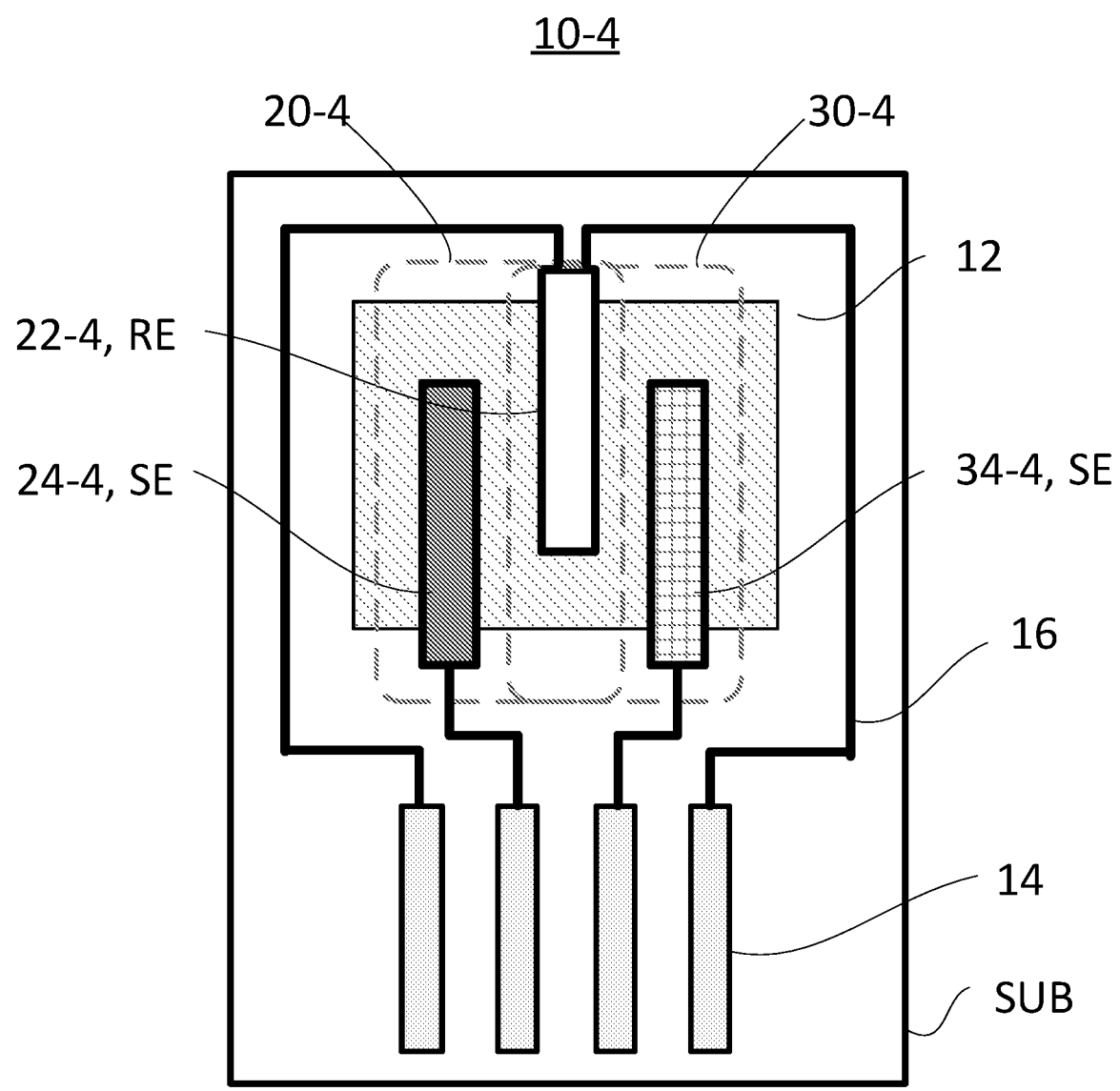
FIG. 5 is a schematic drawing of a multi-electrode sensor array in which a first test couple and a second test couple share a single common pseudo-reference electrode.

In some embodiments, as shown in FIG. 5, the number of pseudo-reference electrodes RE in the multi-electrode array 10-4 may be smaller than the number of sensing electrodes SE. In some embodiments, the first pseudo-reference electrode and the second pseudo-reference electrode may be the same electrode (i.e., a single pseudo-reference electrode 22-4 that contributes to two different test couples 20-4 and 30-4). For example, "the first pseudo-reference electrode" and "the second pseudo-reference electrode" may refer to either 1) two separate electrodes, or 2) a single shared electrode that contributes to (or is counted in) two different test couples. For example, two or more test couples 20-4 and 30-4 may share a common pseudo-reference electrode 22-4, such that a multi-electrode sensor array having two test couples might have two sensing electrodes 24-4 and 34-4 that are each referenced against a single, common pseudo-reference electrode 22-4.

According to embodiments of the present disclosure, a multi-electrode sensor array includes a substrate and n test couples on the substrate, wherein n is an integer of 2 or greater. Each test couple may include a pseudo-reference electrode and a sensing electrode including a material capable of oxidizing or reducing a gas of interest, and each of the n test couples may be distinct and different from each other (e.g., none of the n test couples include the exact same pair of electrodes and operating temperature, and are different with respect to one or more thereof). A solid electrolyte layer that is common to and continuous over the n test couples may cover at least a portion of the pseudo-reference electrode and at least a portion of the sensing electrode in each of the n test couples. At least one of the n test couples may include an initial test couple and one or more duplicates thereof (e.g., there may be multiple instances of the nth test couple), which may be connected in electrical series so that unlike electrodes are electrically connected (e.g., the sensing electrode of an initial first test couple is electrically connected to the pseudo-reference electrode of a first duplicate of the first test couple, etc.), and a mixed potential is measured across the electrical series. The mixed potential measured across the electrical series of the nth test couple may be larger than the mixed potential measured only across the initial nth test couple The pseudo-reference electrodes in the electrical series of the nth test couple may include or be formed of the same material, and the sensing electrodes in the electrical series of the nth test couple connected in series may include or be formed of the same material. The solid electrolyte layer may be common (shared) between the n test couples, discontinuous between each of the duplicate test couples that are connected in series, and common (shared) between e.g., the first duplicates of each of the n test couples (when present). The substrate, pseudo-reference electrode, sensing electrode, solid electrolyte layer, and other elements may each be substantially the same as described above.

According to embodiments of the present disclosure, a multi-electrode sensor array is fabricated by depositing two or more test couples on a substrate, where each test couple includes a pseudo-reference electrode and a sensing electrode. The pseudo-reference electrodes and sensing electrodes may be formed on the substrate using the same materials as described above. The electrodes may be formed or deposited using any suitable method, such as screen printing, tape casting, inkjet printing, laser printing, lithography (e.g., photolithography), chemical vapor deposition (CVD), physical vapor deposition (PVD), etc. In some embodiments, the electrodes may be screen printed and deposited as inks.

Subsequently, the common solid electrolyte layer may be formed over the substrate and the two or more test couples using the same materials as described above. The common solid electrolyte layer may be continuous between (among) the two or more test couples, and may cover at least a portion of the pseudo-reference electrode and the sensing electrode in each of the two or more test couples. The electrodes and the common solid electrolyte layer of the array may then be sintered to solidify, crystallize, or otherwise stabilize the deposited materials. The sintering temperature is not particularly limited, but in some embodiments may be about 1000° C. to about 1200° C., for example, about 1100° C. Finally, the connecting wires and connection pads may be deposited on the substrate. Those having ordinary skill in the art are capable of extending the above-described method to other multiplicities of test couples and duplicates thereof, based on the various descriptions of electrode configuration.

The following examples are provided for illustrative purposes only, and do not limit the scope of the embodiments of the present disclosure.

EXAMPLES

Examples 1-4: Electrode Designs

FIG. 1 is a schematic drawing of a multi-electrode sensor array including a total of four test couples, with two unique (initial) test couples and one duplicate of each. The first test couple on the upper left includes a Pt pseudo-reference electrode and a lanthanum chromite (Cr or LSC) sensing electrode. The second test couple on the upper right includes a Pt pseudo-reference electrode and a gold (Au or Au—Pd) sensing electrode. The first and second test couples are each duplicated and connected to their respective duplicates in series (lower portion) so that the sensing electrode of each upper test couple is connected to the pseudo-reference electrode of each middle test couple. A first common solid electrolyte layer is deposited over the upper two test couples, and a second (separate) common solid electrolyte layer is deposited over the lower two test couples. Accordingly, all four electrodes of the upper two test couples are ionically connected to each other, while all four electrodes of the lower two test couples are (separately from the upper two test couples) ionically connected to each other. In FIG. 1, the white YSZ solid electrolyte layer is depicted as being transparent over the electrodes in order to reveal the shape of each electrode, but is understood to have a rectangular shape that covers each of the electrodes except for the ends that extend past the perimeter of the rectangular YSZ layer. The pseudo-reference electrode of each upper test couple and the sensor electrode of each middle test couple are connected via conductive wires to separate connection pads along the bottom of the device in a 1:1 correspondence. Each of the electrodes in FIG. 1 has a substantially rectangular shape, and the electrodes are generally coplanar.

FIG. 2 is a schematic drawing of a multi-electrode sensor array similar to that shown in FIG. 1, except that the sensing electrodes in each test couple each have a U shape, and are paired with pseudo-reference electrodes having a complementary rectangular shape inserted into the U. FIGS. 2A-2B are schematic drawings showing example layouts of a single test couple including a sensing electrode SE and a pseudo-reference electrode RE, where the pseudo-reference electrode RE is placed in the negative region NR of the sensing electrode SE. The sensing electrode of FIG. 2B further includes a connecting portion CP connected to a middle region of the U-shape on the opposite side of the negative region and extending away from the negative region to facilitate an electrical connection to another element of the multi-electrode array.

FIG. 3 is a schematic drawing of a multi-electrode sensor array similar to that shown in FIG. 1, except that the sensing electrodes in each couple each have a E, W, or comb shape (which in some embodiments may be defined as including a plurality of U's), and are paired with a pseudo-reference electrode having a complementary U shape interdigitated with or inserted into the sensing electrode with the E, W, comb, or other shape with a plurality of U's.

FIG. 5 is a schematic drawing of a multi-electrode sensor array similar to FIG. 1, except that the first test couple and the second test couple share a single common pseudo-reference electrode (22-4). Although additional duplicate test couples are not shown in the sensor array of FIG. 5, those having ordinary skill in the art are capable of producing arrays including such duplicates, as described herein.

While embodiments having flat coplanar electrodes have been described and illustrated herein, embodiments of the present disclosure are not limited thereto. In some embodiments, for example, the electrodes may be deposited on two or more different planes, for example, with insulating layers separating test couples from each other. In some embodiments, the electrodes may be deposited so that their bottom or top surfaces (e.g., normal to the thickness direction) are parallel and ionically connected with solid electrolyte in order to increase the surface area between electrodes and thereby increase the sensitivity. In some embodiments, the U-shaped sensing electrode may be deposited as two parallel plates sandwiching two solid electrolyte layers and a pseudo-reference layer sandwiched therebetween.

Example 5: Detection of $NO_x/NH_3$ Hydrocarbon Complexes

It is well known that airborne pollution (smog) and aerosols can interact to form complexes in the air in the presence of ultraviolet (UV) light from the sun. Likewise, $NO_x$ and/or ammonia can form similar complexes with hydrocarbons. Such gas phase $NO_x/NH_3$ hydrocarbon complexes can be detected (given sufficiently high vapor pressures) using the multi-electrode sensor array of the present disclosure. A plurality of sensing electrodes possessing differing electrocatalytic activities for hydrocarbon, $NO_x$, and ammonia gases may be paired with a suitable number of pseudo-reference electrodes and heated to an operating temperature at which the $NO_x/NH_3$ hydrocarbon complex molecules are oxidized at the sensing electrode and/or fragmented. The resulting separated hydrocarbon, $NO_x$, and/or ammonia molecules or fragments thereof may then be detected by the sensor array.

Example 6-8: Simulated Field Detection of Ammonia

Simulated field tests may be conducted to demonstrate measurement and control of ammonia concentrations in large-scale poultry production facilities. Under hypothetical working conditions, the output from a multi-electrode mixed potential sensor array would be used to activate a ventilation system, with the goal of keeping the ammonia concentration at a safe level for both animals and human workers, while avoiding unnecessary ventilation and unwanted cooling of the facility.

A field test unit utilizing an internal fan may be used to actively pull a sample of the gas environment outside the field test enclosure and direct the sampled gas across the sensor array for detection. For example, the field test unit may be placed inside of a walk-in hood so that test gases may be measured within a fixed room volume (thereby facilitating accurate calculations of total ammonia concentration), as well as easily released by venting.

Example 6

Figure 6:
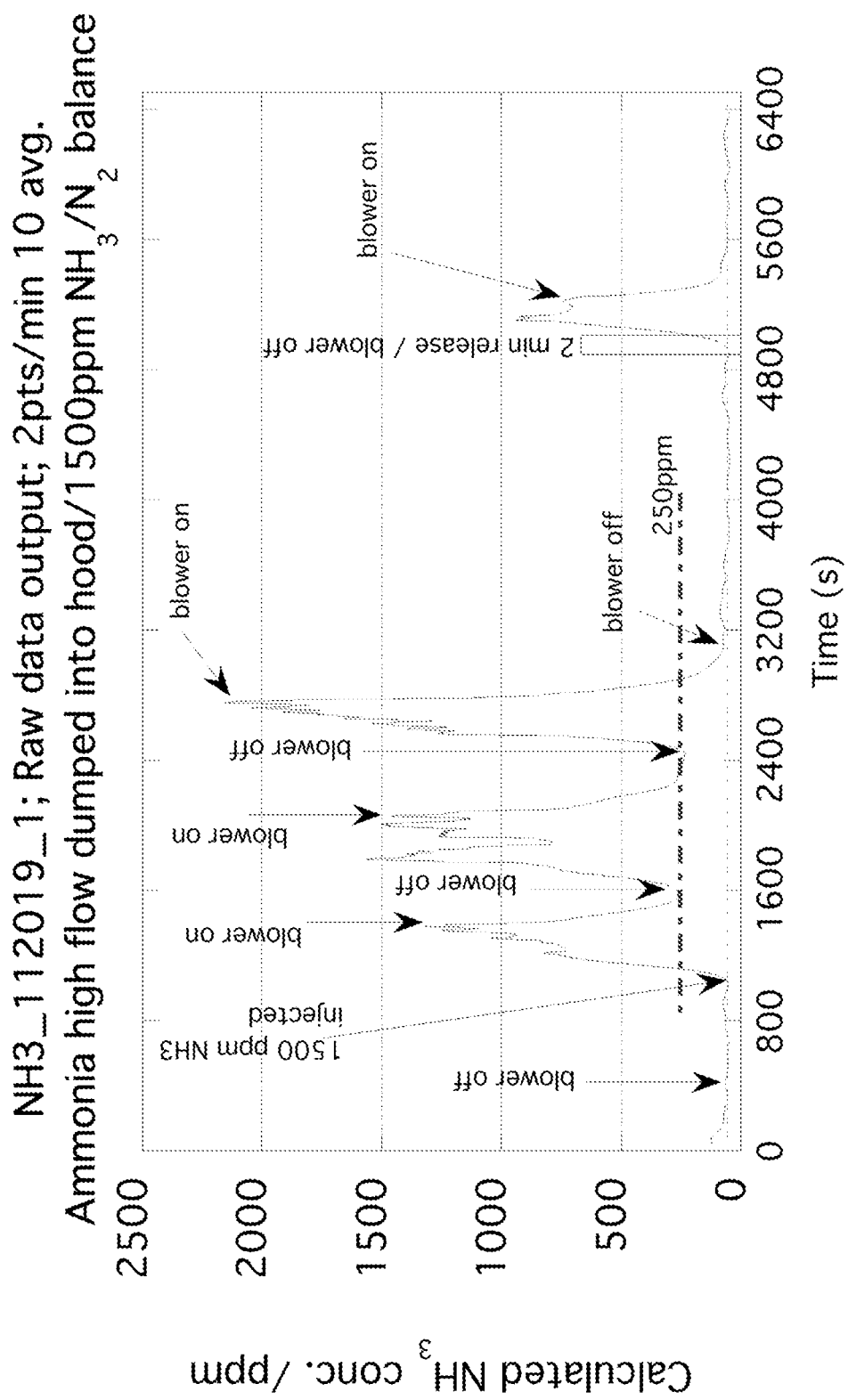
FIG. 6 is a plot of calculated ammonia concentration over time, annotated to show the correlation of values with relevant events, in a field test unit exposed to injected ammonia gas.

A first test simulated the buildup of ammonia levels from an ammonia source (bottle of 1504 ppm $NH_3/N_2$ balance) into a room tied to a ventilation system. A Pd—Au electrode responsive to ammonia was used to report the ammonia concentration, as calculated using a pre-determined calibration curve. Whenever the ammonia concentration rose to a high (set or predetermined maximum breakpoint) level, a switch activating the forced ventilation system was turned on to remove excess ammonia from inside the hood enclosure. FIG. 6 is a plot of calculated ammonia concentration over time, annotated to show the correlation of values with relevant events. FIG. 6 shows a rise in sensor voltage after the ammonia was injected inside the hood (at ca. 1000 s). As expected, the ammonia concentration dropped rapidly while the hood enclosure was ventilated ("blower on"). The ammonia source was not turned off during each ventilation period, so a steady state ammonia concentration was observed to be around 250 ppm. When the active ventilation was turned off, the ammonia level again quickly rose until the blowers were restarted. This cycle was repeated four times.

The test of Example 6 served to demonstrate that the sensor response was 1) reproducible, 2) exhibited a fast response time, 3) was not negatively impacted by high ammonia concentrations, and 4) the signal could be used for automated control of a ventilation motor with the appropriate control electronics.

The next Examples show that the ammonia sensor is fully capable of detecting ammonia concentrations at lower levels, and shows an example of how voltage outputs from a multi-element MPS sensor array can be used to reduce false positives in real-world applications. The 0-100 ppm concentration used in these tests are consistent with levels expected inside a poultry facility.

Example 7

Figure 7:
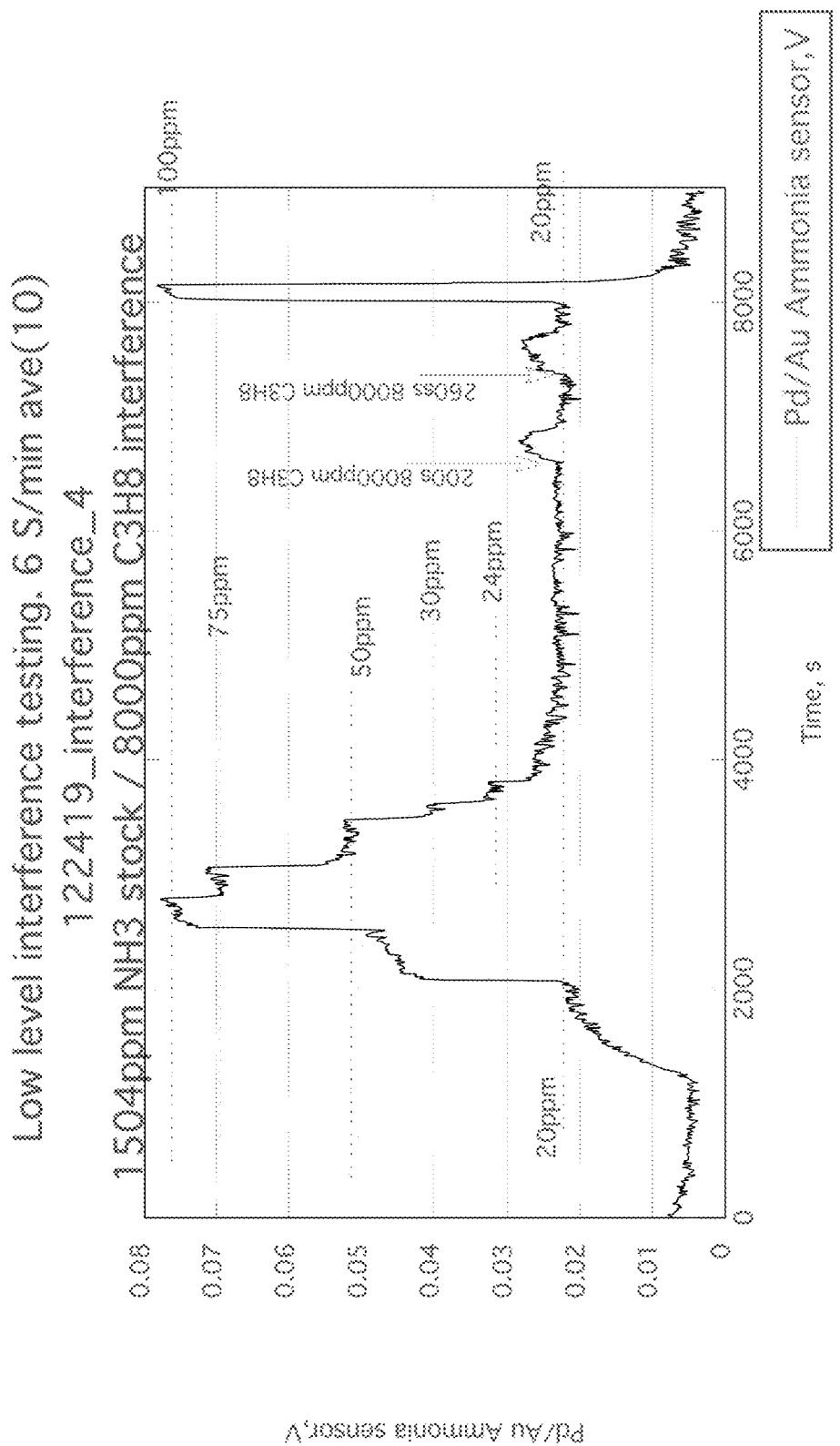
FIG. 7 is a plot showing the mixed potential at a Pd—Au sensing electrode included in a multi-electrode sensor array, in response to a 0, 20, 50, 100, 75, 50, 30, 24, 20 ppm modified-profile staircase challenge of $NH_3$, followed by injection of 8000 ppm of propane and finally a pulsed increase in ammonia concentration from 20 to 100 ppm.

FIG. 7 (Example 7) is a plot showing the mixed potential at a Pd—Au sensing electrode included in a multi-electrode sensor array, in response to a 0, 20, 50, 100, 75, 50, 30, 24, 20 ppm modified-profile staircase challenge of $NH_3$. The blue line refers to the baseline voltage (e.g. the mixed potential at 0 ppm $NH_3$, when only clean air was present). The Pd—Au sensing electrode was used because it exhibits preferential selectivity to $NH_3$. The data show that a large ~20 mV potential was produced by the sensor when only 20 ppm of ammonia was introduced to the sensor array.

The $NH_3$ level was held at 20 ppm, and a concentration of 8000 ppm of propane (balance $N_2$) was introduced from a source bottle, injected inside the walk-in hood enclosure, and subsequently presented to the sensors at the times indicated in the plot (ca. 6500 s and 7300 s). The Pd—Au sensor showed a negligible response to the hydrocarbon interference.

Figure 8:
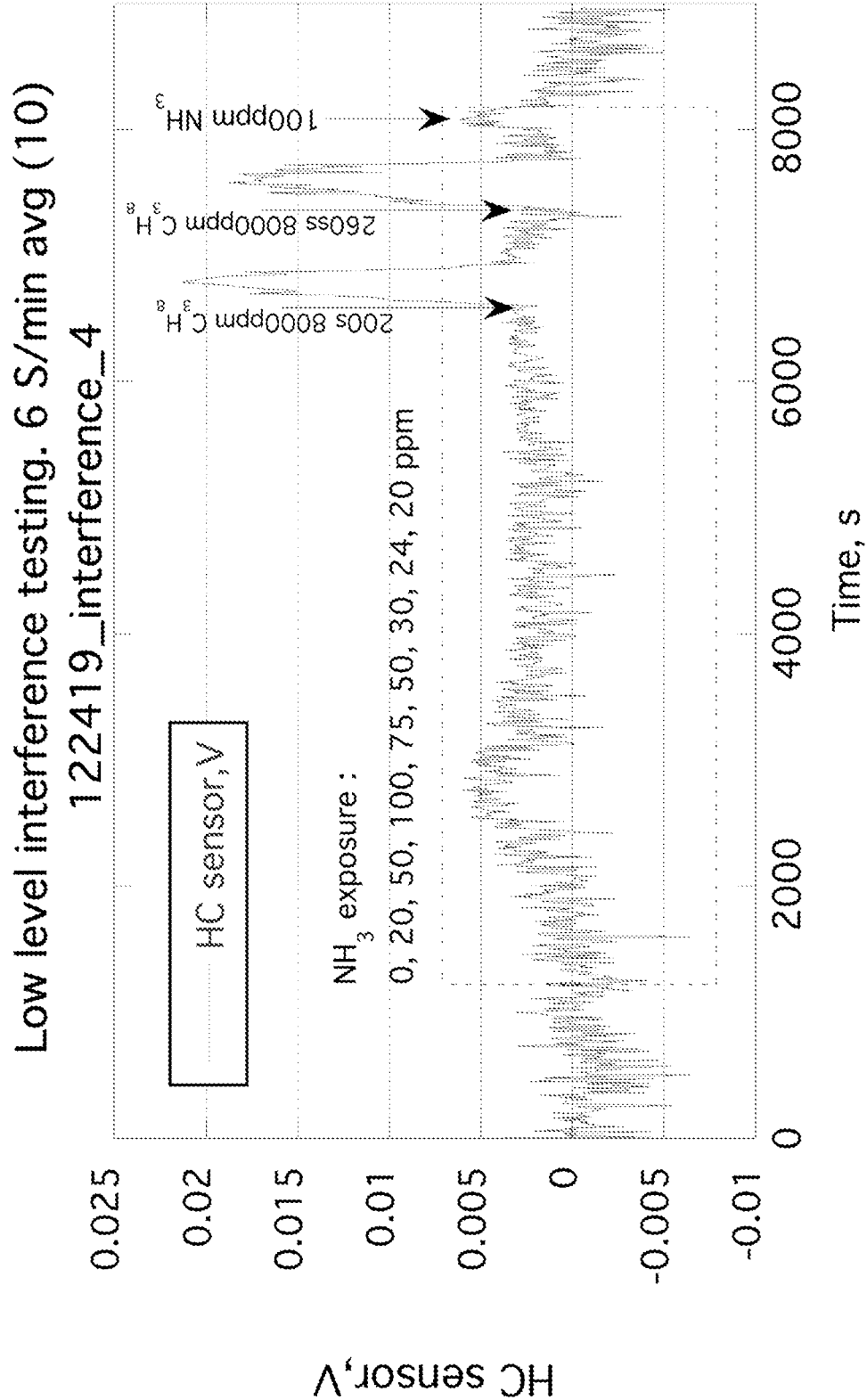
FIG. 8 is a plot showing the mixed potential voltage response of a lanthanum chromite sensing electrode included in the multi-electrode sensor array, in response to the same gas injection profile of FIG. 7.

FIG. 8 is a plot showing the mixed potential voltage response of a lanthanum chromite sensing electrode included in the multi-electrode sensor array. While the Pd—Au sensing electrode showed a well-defined and strong response (e.g. high sensitivity) to changes in $NH_3$ concentration changes, the lanthanum chromite sensing electrode showed a negligible response, and a complete lack of the distinctive staircase pattern that was seen with the Pd—Au electrode. The extent of the voltage produced by the chromite sensor during ammonia exposure was ~7 mV, compared to ~70 mV produced by the Pd/Au electrode.

In contrast, the lanthanum chromite sensing electrode (which is sensitive to hydrocarbon analytes) showed a strong response to the injection of 8000 ppm of propane. Notably, the small rise in the response from the Pd—Au sensing electrode as seen in FIG. 7 could have been misinterpreted as a small (few ppm) increase in ammonia. Had the Pd—Au sensing electrode been used as the sole sensing data input, the data could have been interpreted as false positive ammonia response. By utilizing the multi-electrode sensor array according to embodiments of the present disclosure and calibrating the sensing electrode responses using separate ammonia and hydrocarbon test mixtures and the appropriate sensor response model, the sensor voltages may be accurately converted to respective concentration levels.

Example 8

The field test unit was finally subjected to a pulsed increase in ammonia concentration from 20 to 100 ppm (ca. 8000 s). As shown in FIG. 7, the Pd—Au sensing electrode showed excellent reproducibility in the sensor response, lack of hysteresis, and a fast response time. The Pd—Au electrode responded to this event by producing a sharp rise in voltage.

Under field use, the ventilation system of the poultry coop enclosure could be configured such that fresh air would be introduced inside the facility if the voltage from the Pd—Au sensing electrode exceeded ca. 75 mV (e.g. 100 ppm $NH_3$). Further, the multi-electrode array-equipped control system could be configured so that the ventilation system would only trigger when a simultaneous threshold voltage is surpassed by the lanthanum chromite sensing electrode, in agreement with the threshold set for the Pd—Au sensing electrode.

Conversely, if the lanthanum chromite sensing electrode produced a sharp rise without a similar response from the Pd—Au sensing electrode, the event could be attributable to something other than a spike in ammonia inside the facility. As seen from these Examples, the use of a sensor array can therefore reduce the incidence and likelihood of a false positive alarm/mitigation measure.

The performance of a system using the multi-electrode sensor array may be further improved or tailored to the application by augmenting the response sensitivity (e.g., of the lanthanum chromite sensing electrode to hydrocarbons) using further modified array designs, as described herein.

The multi-sensor device according to embodiments of the present disclosure has potential applications in a number of fields, including control and monitoring of vehicles, industrial plants, and/or fossil-fuel based power plant emissions; general air quality monitoring in industrial, commercial, office, and residential environments; detection and discrimination of narcotics, energetic materials, explosive precursors, and/or chemical warfare agents; disease diagnostics by breath analysis; health monitors; oil refining; and industrial animal agriculture monitoring. The design of the device as described herein can be manufactured using straightforward manufacturing procedures that are easy to scale and optimize for cost and performance requirements. The use of multiple electrodes provides sensitive, consistent, reliable, and accurate measurements of multiple gases with minimal drift and less than 2% error under complex (mixed) gas environments.

While certain exemplary embodiments of the present disclosure have been illustrated and described, those of ordinary skill in the art will recognize that various changes and modifications can be made to the described embodiments without departing from the spirit and scope of the present invention, and equivalents thereof, as defined in the claims that follow this description. For example, although certain components may have been described in the singular, i.e., "an" electrode, "a" material, and the like, one or more of these components in any combination can be used according to the present disclosure.

It will be understood that, although the terms "first," "second," "third," etc., may be used herein to describe various elements, components, regions, layers and/or electrodes, these elements, components, regions, layers and/or electrodes are not limited by these terms. These terms are merely used to distinguish between various elements, components, regions, layers and electrodes. Thus, a first element could be equivalently referred to as a second element without departing from the spirit and scope of the present disclosure.

It is understood that when an element or layer is referred to as being "on," "connected to," or "coupled to" another element or layer, it can be directly on, connected to, or coupled to the other element or layer, or one or more intervening elements or layers may be present. In addition, it is understood that when an element or layer is referred to as being "between" two elements or layers, it can be the only element or layer between the two elements or layers, or one or more intervening elements or layers may also be present.

Also, although certain embodiments have been described as "comprising" or "including" the specified components, embodiments "consisting essentially of" or "consisting of" the listed components are also within the scope of this disclosure. For example, while embodiments of the present invention are described as comprising a substrate and n test couples, embodiments consisting essentially of or consisting of these items are also within the scope of this disclosure.

Accordingly, a multi-electrode sensor array may consist of a substrate and n test couples, or may consist essentially of a substrate and n test couples. In this context, "consisting essentially of" means that any additional components will not materially affect the performance of the multi-electrode sensor array.

As used herein, unless otherwise expressly specified, all numbers such as those expressing values, ranges, amounts or percentages may be read as if prefaced by the word "about," even if the term does not expressly appear. Further, the word "about" is used as a term of approximation, and not as a term of degree, and reflects the penumbra of variation associated with measurement, significant figures, and interchangeability, all as understood by a person having ordinary skill in the art to which this disclosure pertains. Any numerical range recited herein is intended to include all sub-ranges subsumed therein. Plural encompasses singular and vice versa. For example, while the present disclosure may describe "an" electrode or "a" material, a mixture of such electrodes or materials can be used. When ranges are given, any endpoints of those ranges and/or numbers within those ranges can be combined within the scope of the present disclosure. The terms "including" and like terms mean "including but not limited to," unless specified to the contrary.

Notwithstanding that the numerical ranges and parameters set forth herein may be approximations, numerical values set forth in the Examples are reported as precisely as is practical. Any numerical value, however, inherently contains certain errors necessarily resulting from the standard variation found in their respective testing measurements. The word "comprising" and variations thereof as used in this description and in the claims do not limit the disclosure to exclude any variants or additions.

What is claimed is:

1. A system comprising;
a mixed potential sensor array, the mixed potential sensor array comprising:
a substrate;
a first test couple positioned on a first surface of the substrate, the first test couple comprising a first sensing electrode and a first pseudo-reference electrode spaced apart from the first sensing electrode, the first sensing electrode having a first sensing comb shape comprising a first plurality of sensing prongs defining a first plurality of U-shaped concave regions, and the first pseudo-reference electrode having a first pseudo-reference comb shape or first pseudo-reference U-shape comprising a first plurality of pseudo-reference prongs configured to fit in corresponding ones of the first plurality of U-shaped concave regions of the first sensing electrode;
a second test couple positioned on the first surface of the substrate, the second test couple comprising a second sensing electrode and a second pseudo-reference electrode spaced apart from the second sensing electrode by a second separation distance, the second sensing electrode having a second sensing comb shape comprising a second plurality of sensing prongs defining a second plurality of U-shaped concave regions, and the second pseudo-reference electrode having a second pseudo-reference comb shape or second pseudo-reference U-shape comprising a second plurality of pseudo-reference prongs configured to fit in corresponding ones of the second plurality of U-shaped concave regions of the second sensing electrode; and
a common solid electrolyte layer that is continuous over the first test couple and the second test couple, the common solid electrolyte layer covering at least a portion of the first sensing electrode, at least a portion of the first pseudo-reference electrode, at least a portion of the second pseudo-reference electrode, and at least a portion of the second sensing electrode, such that the covered portions of the first sensing electrode, the first pseudo-reference electrode, the second pseudo-reference electrode, and the second sensing electrode are positioned between the common solid electrolyte layer and the first surface of substrate,
the first sensing electrode and the second sensing electrode each comprising a material capable of oxidizing or reducing a gas of interest, and
a ratio of a surface area of the first sensing electrode to a surface area of the first pseudo-reference electrode, and a ratio of a surface area of the second sensing electrode to a surface area of the second pseudo-reference electrode each independently being 1.5:1 to 2.5:1; and
means for generating a mixed potential in the first sensing electrode or the second sensing electrode in the mixed potential sensor array.

2. The system of claim 1, wherein the first pseudo-reference electrode and the second pseudo-reference electrode each independently comprise at least one of platinum (Pt), lanthanum cobaltite, lanthanum ferrite, or lanthanum manganite.

3. The system of claim 1, wherein the first sensing electrode and the second sensing electrode each independently comprise at least one of gold (Au), an Au—Pd alloy, lanthanum chromite, lanthanum strontium chromite, doped lanthanum chromite, a spinel, or a metal oxide.

4. The system of claim 1, wherein the common solid electrolyte layer comprises at least one of yttria-stabilized zirconia (YSZ), Sc stabilized zirconia (ScSZ), Gd doped Ceria (GDC), or Sm doped Ce (SDC).

5. The system of claim 1, wherein the ratio of the surface area of the first sensing electrode to the surface area of the first pseudo-reference electrode and the ratio of the surface area of the second sensing electrode to the surface area of the second pseudo-reference electrode are each independently 2:1 to 2.5:1.

6. The system of claim 1, wherein each of the first and second pseudo-reference electrodes is separated from each interior wall of each of the first and second sensing electrodes, respectively, by a consistent distance.

7. The system of claim 1, wherein the mixed potential sensor array further comprises:
a resistive heating wire on a second surface of the substrate opposite the first and second test couples,
wherein a density of the resistive heating wire is greater under the first test couple than under the second test couple.

8. The system of claim 1, wherein each of the first and second sensing electrodes is operated at a different temperature between 300° C. and 600° C.

9. The system of claim 1, wherein the first and second test couples share a single common pseudo-reference electrode, the first pseudo-reference electrode and the second pseudo-reference electrode both referring to the single common pseudo-reference electrode.

10. The system of claim 1, wherein the mixed potential sensor array further comprises:

a third test couple substantially similar to the first test couple, connected in series with the first test couple so that unlike electrodes are electrically connected; and a fourth test couple substantially similar to the second test couple, connected in series with the second test couple so that unlike electrodes are electrically connected, the third and fourth test couples being on the substrate.

11. The system of claim 1, further comprising connection pads electrically connected to one or more of the first and second sensing and pseudo-reference electrodes via one or more wires, each wire making contact with an electrode in a region that is not covered by the common solid electrolyte layer.

12. The system of claim 11, wherein the connection pads are positioned proximate an edge of the substrate.

13. A system comprising:
a mixed potential sensor array, the mixed potential sensor array comprising:
a substrate;
n test couples positioned on a first surface of the substrate, wherein n is an integer of 2 or greater, each test couple comprising:
a pseudo-reference electrode; and
a sensing electrode comprising a material capable of oxidizing or reducing a gas of interest;
a solid electrolyte layer that is common to and continuous over the n test couples, such that the n test couples are positioned between the solid electrolyte layer and the first surface of substrate; and
one or more duplicate test couples corresponding to one of the n test couples, each of the one or more duplicate test couples being electrically connected in a series with its corresponding one of the n test couples, the solid electrolyte layer being discontinuous between the one or more duplicate test couples and the corresponding one of the n test couples that are electrically connected in the series and wherein, in each one of the n test couples and duplicate test couples, a ratio of a surface area of the sensing electrode to a surface area of the pseudo-reference electrode is 1.5:1 to 2.5:1, a separation distance between the sensing electrode and the pseudo-reference electrode is 2 mm to 7 mm, the sensing electrode having a sensing comb shape comprising a plurality of sensing prongs defining a plurality of U-shaped concave regions, and the pseudo-reference electrode having a pseudo-reference comb shape or pseudo-reference U-shape comprising a plurality of pseudo-reference prongs configured to fit in corresponding ones of the plurality of U-shaped concave regions of the sensing electrode; and means for generating a mixed potential in at least one of the sensing electrodes of the n test couples of the mixed potential sensor array.

14. The system of claim 13, wherein the pseudo-reference electrode in each of the n test couples and the one or more duplicate test couples independently comprises platinum (Pt), lanthanum cobaltite, lanthanum ferrite, or lanthanum manganite.

15. The system of claim 13, wherein the sensing electrode in each of the n test couples and the one or more duplicate test couples independently comprises gold (Au), an Au—Pd alloy, lanthanum chromite, a spinel, or a metal oxide.

16. The system of claim 13, wherein the solid electrolyte layer comprises yttria-stabilized zirconia (YSZ).

17. The system of claim 13, wherein, in each of the n test couples and the one or more duplicate test couples, the ratio of the surface area of the sensing electrode to the surface area of the pseudo-reference electrode is greater than 2:1 to 2.5:1.

18. The system of claim 13, wherein in each of the n test couples and the one or more duplicate test couples, the pseudo-reference electrode is separated from each interior wall of the sensing electrode by a consistent distance.

19. The system of claim 13, wherein the mixed potential sensor array further comprises:
a resistive heating wire under at least a first and a second one of the n test couples and their corresponding duplicate test couples,
wherein a density of the resistive heating wire is different under each of at least the first and the second one of the n test couples and their corresponding duplicate test couples.

20. The system of claim 13, wherein at least one of the n test couples shares the same pseudo-reference electrode with another one of the n test couples.

* * * * *